(12) United States Patent
Falls et al.

(10) Patent No.: US 10,252,609 B2
(45) Date of Patent: Apr. 9, 2019

(54) HYBRID AXLE ASSEMBLY FOR A MOTOR VEHICLE

(71) Applicant: Linamar Corporation, Guelph (CA)

(72) Inventors: Bruce Falls, Dove Canyon, CA (US); Adrian Quintana, National City, CA (US); Thanh Nguyen, Laguna Niguel, CA (US); Mike Browne, Rochester Hills, MI (US); Michael Colby Sefcik, Linden, MI (US); Kevin Ledford, Macomb, MI (US)

(73) Assignee: Linamar Corporation, Guelph, Ontario (CA)

( * ) Notice: Subject to any disclaimer, the term of this patent is extended or adjusted under 35 U.S.C. 154(b) by 0 days.

(21) Appl. No.: 15/787,820

(22) Filed: Oct. 19, 2017

(65) Prior Publication Data

US 2018/0099556 A1    Apr. 12, 2018

Related U.S. Application Data

(62) Division of application No. 14/777,075, filed as application No. PCT/US2014/030304 on Mar. 17, 2014, now Pat. No. 9,821,650.
(Continued)

(51) Int. Cl.
*B60K 11/02* (2006.01)
*B60K 1/02* (2006.01)
(Continued)

(52) U.S. Cl.
CPC ............... *B60K 11/02* (2013.01); *B60K 1/02* (2013.01); *B60K 7/0007* (2013.01);
(Continued)

(58) Field of Classification Search
CPC ....... B60K 11/02; B60K 11/073; B60K 11/33; B60K 1/046; B60K 2001/003;
(Continued)

(56) References Cited

U.S. PATENT DOCUMENTS

| | | | |
|---|---|---|---|
| 2005/0282676 A1* | 12/2005 | Forster | B60K 17/046 475/6 |
| 2009/0283345 A1* | 11/2009 | Kabrick | B60K 7/0007 180/65.51 |

(Continued)

FOREIGN PATENT DOCUMENTS

DE    102008061449    6/2010

*Primary Examiner* — Erez Gurari
(74) *Attorney, Agent, or Firm* — Miller Canfield

(57) ABSTRACT

An axle assembly for an electric or hybrid vehicle includes electrically powered drive motors for respectively driving vehicle wheels. The axle assembly preferably includes a dual motor arrangement, wherein two electric motors are arranged end-to-end. Each motor includes an inverter that is directly connected to its respective motor, and includes a gearbox assembly coupled between an output of the motor and a corresponding constant-velocity (CV) joint operatively connected to a wheel. The inboard ends of the motors are secured to opposite faces of a cooling manifold wherein the cooling manifold maintains the motors in axial alignment. The cooling manifold plate is positioned between an inboard end of each of the motor housings, and the cooling manifold plate axially aligns the first and second motors. Further, each motor drives its respective gearbox assembly, which includes a gear reduction and clutch mechanism having a brake band assembly that is selectively operable to disconnect the respective motor from the vehicle wheel associated therewith.

11 Claims, 20 Drawing Sheets

Related U.S. Application Data

(60) Provisional application No. 61/793,593, filed on Mar. 15, 2013.

(51) Int. Cl.

| | | |
|---|---|---|
| *B60K 7/00* | (2006.01) | |
| *B60K 17/04* | (2006.01) | |
| *B60L 7/24* | (2006.01) | |
| *B60L 15/20* | (2006.01) | |
| *H02K 7/00* | (2006.01) | |
| *H02K 7/116* | (2006.01) | |
| *H02K 16/00* | (2006.01) | |
| *H02K 11/33* | (2016.01) | |
| *H02K 9/19* | (2006.01) | |
| *H02K 11/00* | (2016.01) | |
| *H02K 11/30* | (2016.01) | |
| *B60B 35/16* | (2006.01) | |
| *B60K 1/00* | (2006.01) | |

(52) U.S. Cl.
CPC ............ *B60K 17/046* (2013.01); *B60L 7/24* (2013.01); *B60L 15/2009* (2013.01); *B60L 15/2054* (2013.01); *H02K 7/006* (2013.01); *H02K 7/116* (2013.01); *H02K 9/19* (2013.01); *H02K 11/0073* (2013.01); *H02K 11/30* (2016.01); *H02K 11/33* (2016.01); *H02K 16/00* (2013.01); *B60B 35/16* (2013.01); *B60K 2001/003* (2013.01); *B60K 2001/006* (2013.01); *B60K 2007/0046* (2013.01); *B60K 2007/0061* (2013.01); *B60L 2220/42* (2013.01); *B60L 2240/423* (2013.01); *B60L 2240/425* (2013.01); *B60L 2240/507* (2013.01); *B60L 2240/525* (2013.01); *Y02T 10/641* (2013.01); *Y02T 10/645* (2013.01); *Y02T 10/646* (2013.01); *Y02T 10/72* (2013.01); *Y02T 10/7275* (2013.01)

(58) Field of Classification Search
CPC .... B60K 2007/0061; B60K 2007/0046; B60K 2001/006; H02K 11/30; H02K 9/19; H02K 7/006; H02K 7/116; H02K 16/00; B60L 15/2009; B60L 15/2054; B60L 7/0007; B60L 2240/423; B60L 2240/42; B60L 2240/425; B60L 2240/507; B60L 2240/525; Y02T 10/646; Y02T 10/7275; Y02T 10/641; Y02T 10/645; Y02T 10/72; B60B 35/16

See application file for complete search history.

(56) References Cited

U.S. PATENT DOCUMENTS

| | | | |
|---|---|---|---|
| 2012/0015772 A1* | 1/2012 | Kira | B60W 20/13 475/149 |
| 2012/0104883 A1* | 5/2012 | Burns | H02K 5/20 310/54 |
| 2012/0217793 A1* | 8/2012 | Drum | B60B 35/16 301/124.1 |
| 2013/0076126 A1* | 3/2013 | Hashimoto | B60L 1/003 307/9.1 |
| 2013/0150211 A1* | 6/2013 | Aoki | B60K 6/46 477/86 |
| 2014/0333162 A1* | 11/2014 | Karlsson | H02K 5/20 310/54 |
| 2016/0006378 A1* | 1/2016 | Allan | H02P 5/69 318/13 |
| 2016/0039277 A1* | 2/2016 | Falls | B60K 1/02 180/62 |
| 2016/0297291 A1* | 10/2016 | Yamada | B60K 28/14 |
| 2016/0297385 A1* | 10/2016 | Hoshinoya | B60K 1/02 |
| 2017/0313181 A1* | 11/2017 | Isono | B60K 1/02 |
| 2018/0178646 A1* | 6/2018 | Negri | B60K 17/16 |

* cited by examiner

HYBRID AXLE ASSEMBLY FOR A MOTOR VEHICLE

CROSS-REFERENCE TO RELATED APPLICATIONS

This application is a divisional application of U.S. patent application Ser. No. 14/777,075, filed on Sep. 15, 2015, which in turn asserts priority from provisional application 61/793,593, filed on Mar. 15, 2013, which is incorporated herein by reference.

FIELD OF THE INVENTION

The invention relates to an axle assembly for a motor vehicle and more particularly, to an axle assembly for a hybrid vehicle having a dual motor drive unit for driving the vehicle wheels.

BACKGROUND OF THE INVENTION

It is known to provide an electric or hybrid vehicle with an axle assembly using electric motors to drive selected wheels on the vehicle.

The invention relates to an improved axle assembly for an electric or hybrid vehicle, which includes electrically powered drive motors for respectively driving one or more vehicle wheels. The axle assembly preferably includes a dual motor arrangement, wherein two electric motors are arranged end-to-end. Each motor includes an inverter that is directly connected to its respective motor. The inverters preferably are mounted on opposite sides of the axle assembly and convert DC power from the vehicle's battery and power generation system to AC power to drive the motors. In addition, each motor includes a gearbox assembly coupled between an output of the motor and a corresponding support mechanism, such as a constant-velocity (CV) joint, operatively connected to a wheel. Each gearbox assembly selectively transfers torque or rotational movement from an output shaft of the motor to the wheel.

In one aspect of the invention, the electric axle assembly of the invention includes a pair of the electric motors, which are arranged back-to-back with a single cooling manifold located between inboard adjacent ends of the motors. The inboard ends of the motors are secured to opposite faces of the cooling manifold wherein an axis of rotation of each motor output shaft is aligned in registry with the axis of the other motor so that the cooling manifold maintains said motors in axial alignment.

The motors are disposed within separate, respective motor housings and the cooling manifold seals an inboard end of each housing. Each motor includes one of the power inverters, which is electrically connected thereto. The power inverters are disposed on opposite forward and rearward sides of the electric axle assembly. Liquid coolant is supplied to the motors and inverters to cool the motors and associated power inverters during driving of the vehicle.

More specifically, the coolant flows from the vehicle heat exchanger along various flow passageways, which preferably are defined by appropriate tubing, piping or the like. The passageways split a flow of lower temperature or cooled coolant, which is fed separately through each motor in parallel. More particularly, the coolant enters the cooling manifold through a single inlet wherein an internal inlet cooling channel provided within the cooling manifold directs the coolant into multiple inlet ports in the inboard end of each motor to thereby absorb heat from the motors and cool same. After cooling the motors, the heated coolant is discharged from the inboard end of each motor through outlet ports back into an internal outlet cooling channel in the cooling manifold where the coolant is again merged into a single flow. The heated coolant exits the cooling manifold at a single location and is then fed to a first inverter to cool same and then serially into the second inverter for cooling. After the second inverter, the coolant returns to the heat exchanger for subsequent cooling and refeeding of the cooled coolant back to the cooling manifold, motors and inverters. The cooling manifold therefore performs the additional function of defining flow paths or passageways to allow cooling of the motors.

In another aspect of the invention, the electric axle assembly provides a modular construction, which readily allows for assembly of a dual motor configuration while also allowing for a modified single motor configuration, or the provision of alternate configurations of a gearbox assembly. The axle assembly includes a first electric motor housed within a first motor housing and a second electric motor housed within a second motor housing. More specifically, each motor housing includes a cylindrical chamber in which the motor is inserted separately and independently of the other motor. Preferably, the cooling manifold is formed as a cooling manifold plate formed in a uniformly thick, plate shape. Once one or more motors are installed, the cooling manifold plate is positioned between the inboard end of each of the first and second motor housings. As referenced above, the cooling manifold plate axially aligns the first and second motors and encloses the first and second motors in the respective cylindrical chambers of the respective motor housings. The first motor is mounted or fixedly secured to a first side of the cooling manifold plate and the second motor is mounted or fixedly secured to a second side of the cooling manifold plate. As described above, the cooling manifold plate delivers coolant to the first and second motors to cool the motors.

Still further, in another aspect of the invention, each motor drives its respective gearbox assembly, wherein a first gear-set housing is fixedly secured to an outboard end of the first motor housing and houses a gear reduction and clutch mechanism that is coupled between the first motor and an output hub that in turn is operatively coupled to a first vehicle wheel. The gear reduction and clutch mechanism reduces a rotational speed output by the first motor and increases an output torque. The inventive gear reduction and clutch mechanism includes a brake band assembly that is selectively operable to disconnect the first motor from the first vehicle wheel.

Similarly, in the dual motor configuration, a second gear-set housing is fixedly secured to an outboard end of the second motor housing and houses a gear reduction and clutch mechanism that is coupled between the second motor and a second output hub that in turn is operatively coupled to a second vehicle wheel. The gear reduction and clutch mechanism reduces a rotational speed output by the second motor and increases an output torque. Here again, the gear reduction and clutch mechanism includes a brake band assembly that is selectively operable to disconnect the second motor from the second vehicle wheel.

More particularly, each gear reduction and clutch mechanism is coupled between the outboard end of each electric motor and its respective vehicle wheel. The gear reduction mechanism includes a planetary gear system to provide speed and torque conversion between the electric motor and the vehicle wheel. Preferably, the planetary gear system includes a primary ring gear having an integrated brake drum or outer surface, which is part of a band brake assembly. The planetary gear system preferably is a double planetary gear system having two gear sets with one of the gear sets having the primary ring gear cooperating with the band brake assembly. Alternatively, the planetary gear system could have only one gear set, or two or more gear sets. The band brake assembly also includes a band brake, which engages and releases the outer surface of the ring gear for the purpose of connecting and disconnecting the electric motor with the vehicle wheel. For example, when the band brake is engaged with the outer surface of the ring gear, the output of the electric motor is transmitted through the gear reduction mechanism to drive the vehicle wheel. On the other hand, when the band brake is released from the outer surface of the ring gear, the output of the electric motor is not transmitted through the gear reduction mechanism. In other words, when the band brake is released from the outer surface of the ring gear, the electric motor is disconnected from the vehicle wheel.

Each motor housing also includes a secondary chamber on front and back sides of the cylindrical chamber for additional components. For example, a first power inverter is directly connected to the first motor and is positioned in the secondary chamber of the first and second motor housings. A first cover plate is affixed to the first and second motor housings to enclose the first power inverter within the secondary chambers. Similarly, a second power inverter is directly connected to the second motor and is positioned in the secondary chamber of the first and second motor housings. A second cover plate is affixed to the first and second motor housings to enclose the second power inverter within the secondary chambers.

The gearbox assembly of the invention further also may be formed as a two-speed transmission unit which is connectable to and driven by the motors. In a first embodiment, a clutch may be provided in combination with a clutch to Other objects and purposes of the invention, and variations thereof, will be apparent upon reading the following specification and inspecting the accompanying drawings.

Figure 1:
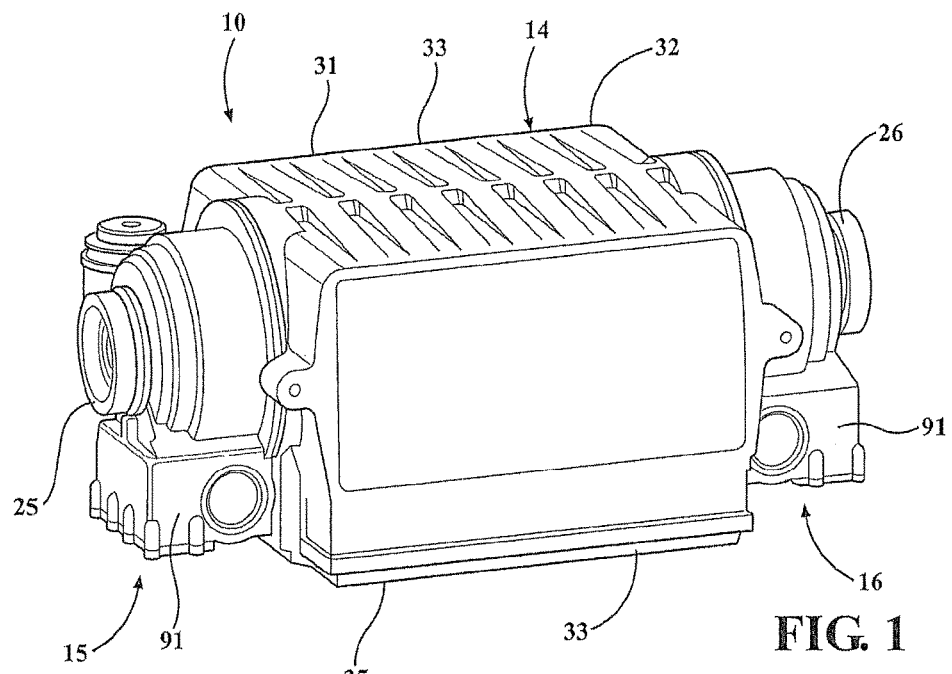
FIG. 1 is an isometric front view of an axle assembly of the invention as viewed from above.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Figure 2:
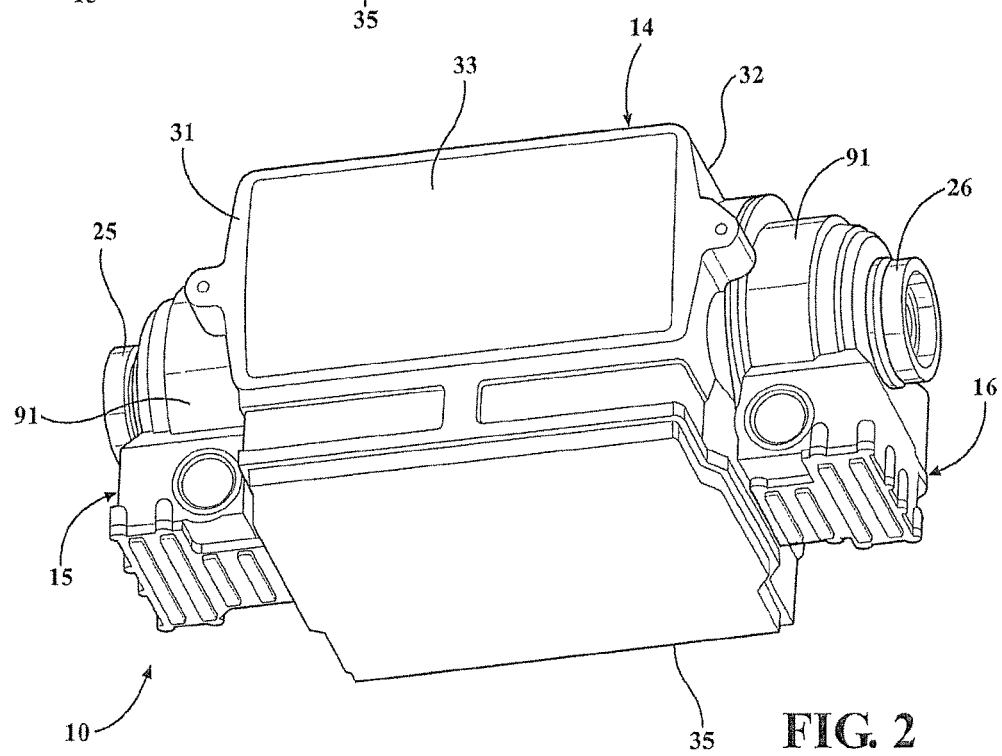
FIG. 2 is an isometric front view thereof as viewed from below.
Figure 3:
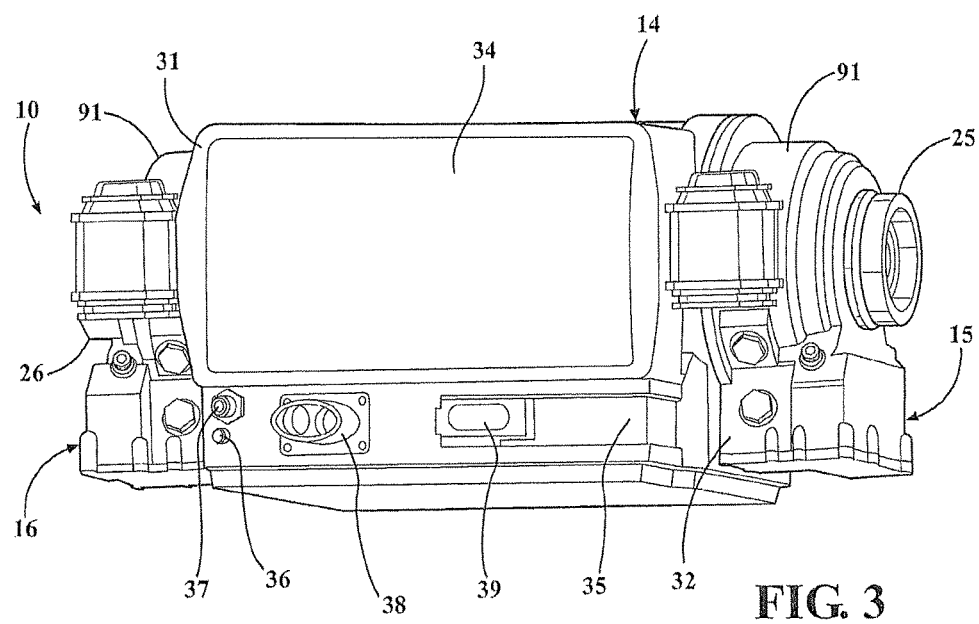
FIG. 3 is an isometric rear view thereof.

Referring to FIGS. 1-3, the invention relates to an improved axle assembly 10 for an electric or hybrid vehicle, which includes electrically powered drive motors 11 and 12 (FIG. 7) that are enclosed within a housing 14 and drive respective gearbox assemblies 15 and 16. The axle assembly 10 includes various improvements over prior art drive systems.

Figure 4:
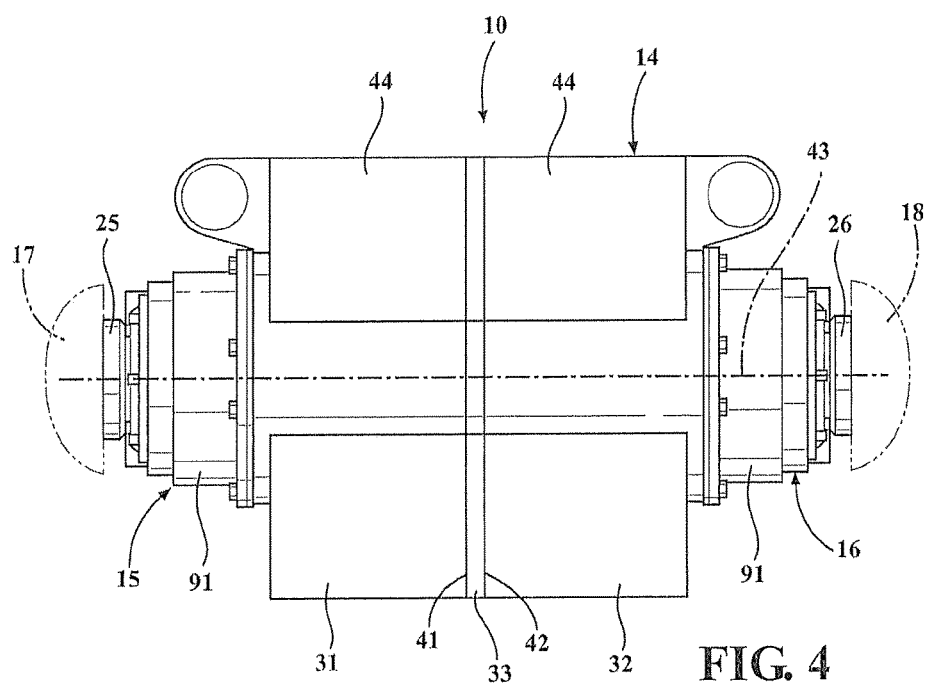
FIG. 4 is a plan view of the axle assembly.
Figure 5:
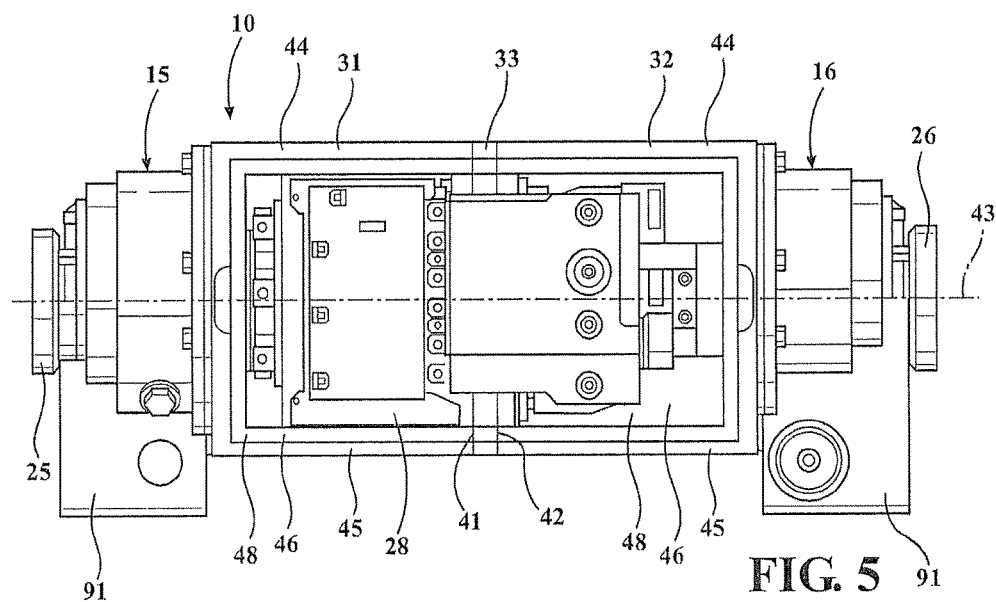
FIG. 5 is a front view thereof.
Figure 6:
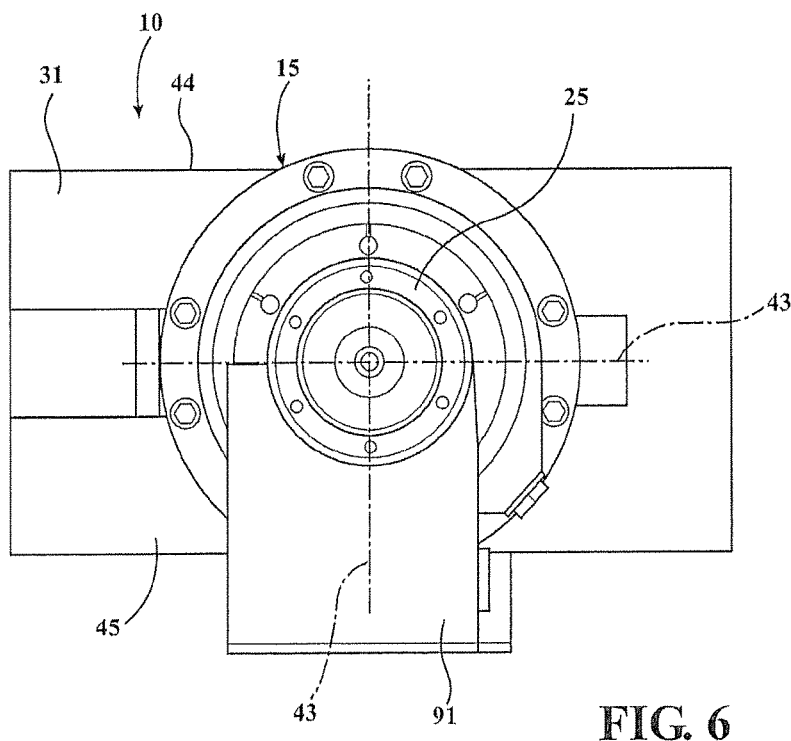
FIG. 6 is an end view thereof.

More particularly, the axle assembly 10 preferably includes a dual motor arrangement, wherein the two electric motors 11 and 12 are arranged end-to-end for respectively driving vehicle wheel assemblies 17 and 18, which are diagrammatically shown in FIG. 4 in phantom outline. In addition, each motor 11 and 12 includes the respective gearbox assembly 15 and 16 coupled to a motor output shaft 22 and 23 (FIG. 13) and a corresponding wheel joint provided as part of the wheel assemblies 17 and 18 of FIG. 4. Each gearbox assembly 15 and 16 selectively transfers torque or rotational movement to a companion flange or output hub 25 and 26, which connects or bolts to the respective wheel assembly 17 and 18. While the axle assembly 10 effects driving of the wheels of the respective wheel assemblies 17 and 18, each gearbox assembly 15 and 16 is configured for operatively disconnecting the motor output shaft 22 and 23 (FIG. 13) from the companion flange 25 and 26 and associated wheel assembly 17 and 18 as will be described hereinafter.

Figure 7:
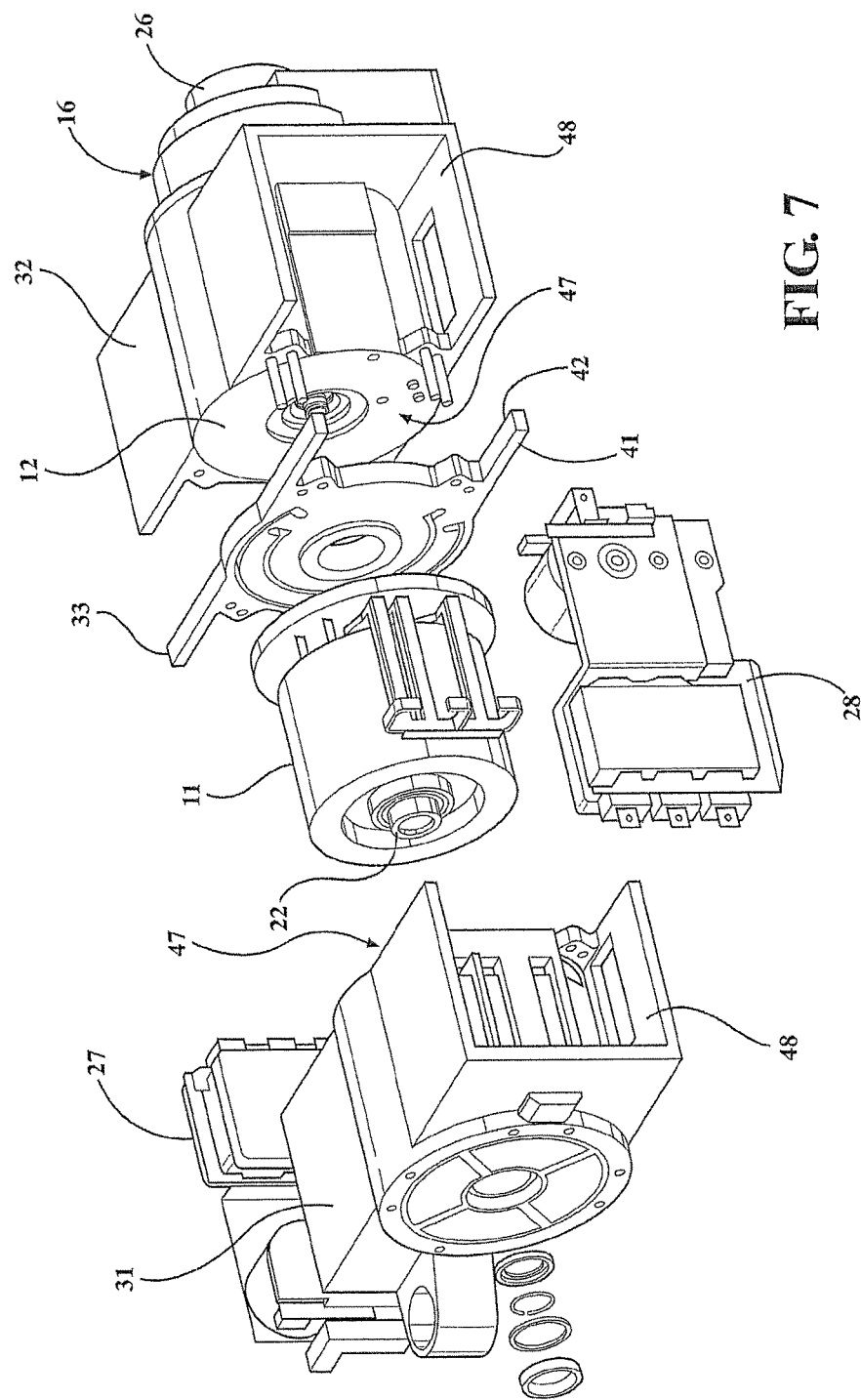
FIG. 7 is an exploded isometric view of the motor drive assembly.

Generally, to operate the motors 11 and 12, each motor 11 and 12 includes a respective inverter 27 and 28 as seen in FIG. 7 that is directly connected to its respective motor 11 and 12. The inverters 27 and 28 are provided as part of the vehicle's battery and power generation system and preferably are mounted on opposite sides of the axle assembly 10 to convert DC power supplied from the vehicles battery and power generation system to AC power to drive the motors 11 and 12.

Referring to FIGS. 1-3, the axle assembly 10 includes the housing 14 to which the gearbox assemblies 15 and 16 are bolted. The housing 14 is formed as an assembly comprising first and second motor housings 31 and 32 and an intermediate cooling manifold 33 which is sandwiched between the motor housings 31 and 32 as will be described further herein. This assembly of the motor housings 31 and 32 defines multiple interior compartments, which compartments in turn are closed off by front and rear housing panels 33 and 34 and a bottom panel 35. Generally, a bottom compartment is closed off by the bottom panel 35 wherein the bottom compartment of the main housing 14 includes a plurality of connectors for the connection of various support equipment. As seen in FIG. 3, the bottom compartment wall includes first and second coolant connectors 36 and 37 for respectively supplying liquid coolant to and from the axle assembly 10. Further, a power connector 38 is provided to supply DC power to the inverters 27 and 28 for driving the motors 11 and 12, and a control connector 39 is also provided which connects to the vehicle's control system for selectively controlling operation of the axle assembly 10.

More particularly as to the electric axle assembly 10 as seen in FIGS. 4-7, a pair of the electric motors 11 and 12 are arranged back-to-back with the single cooling manifold 33 located between inboard adjacent ends of the motors 11 and 12. As will be described further herein, the inboard ends of the motors 11 and 12 are secured to opposite faces 41 and 42 of the cooling manifold 33 and an axis of rotation 43 of each motor output shaft is aligned in registry with the axis 43 of the other one of the motors 11 and 12. As such, the cooling manifold 33 maintains said motors 11 and 12 in axial alignment.

The motors 11 and 12 are disposed within their separate, respective motor housings 31 and 32 and the cooling manifold 33 seals the inboard end of each motor housing 31 and 32. The motor housings 31 and 32 are formed the same as each other so as to have top and bottom walls 44 and 45 and interior side walls 46 which are spaced inwardly of the front and rear terminal edges of the top and bottom walls 44 and 45. With this wall configuration, a motor compartment 47 is formed which opens sidewardly along the motor axis 43, while additional side compartments 48 are formed externally of the motor compartment 47.

Figure 8:
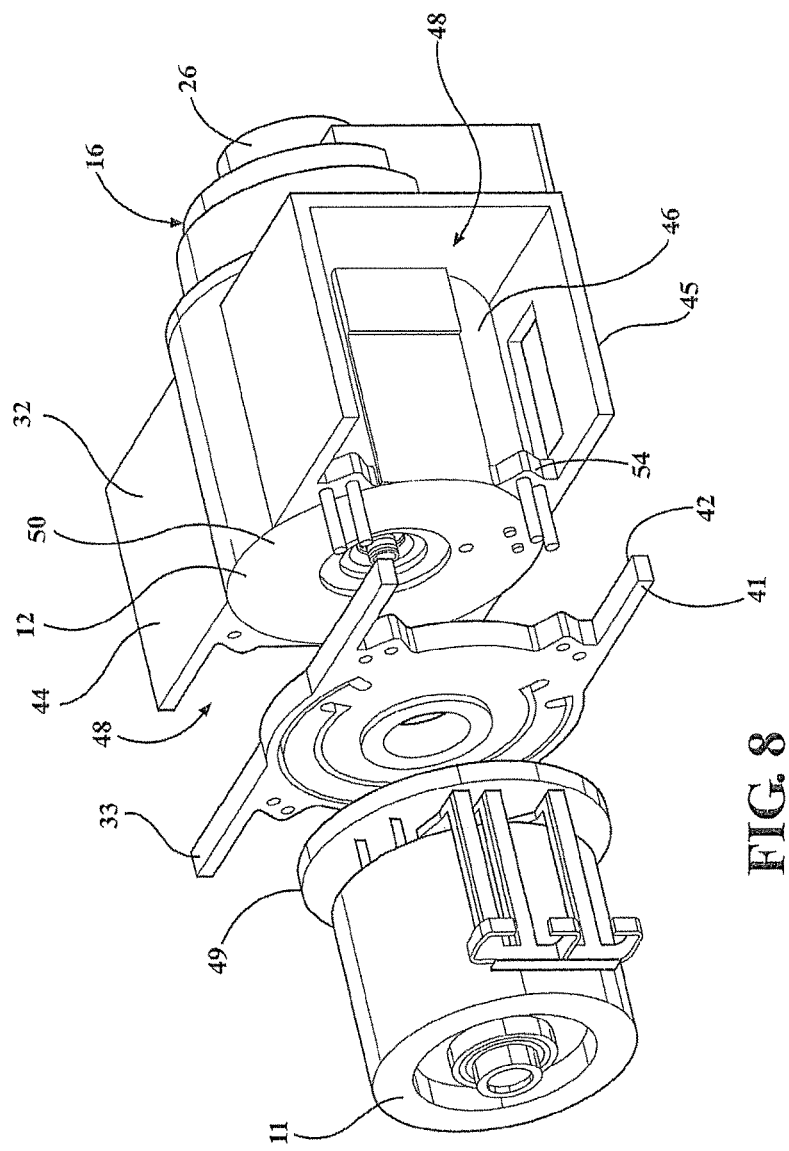
FIG. 8 is an enlarged isometric view thereof.
Figure 9:
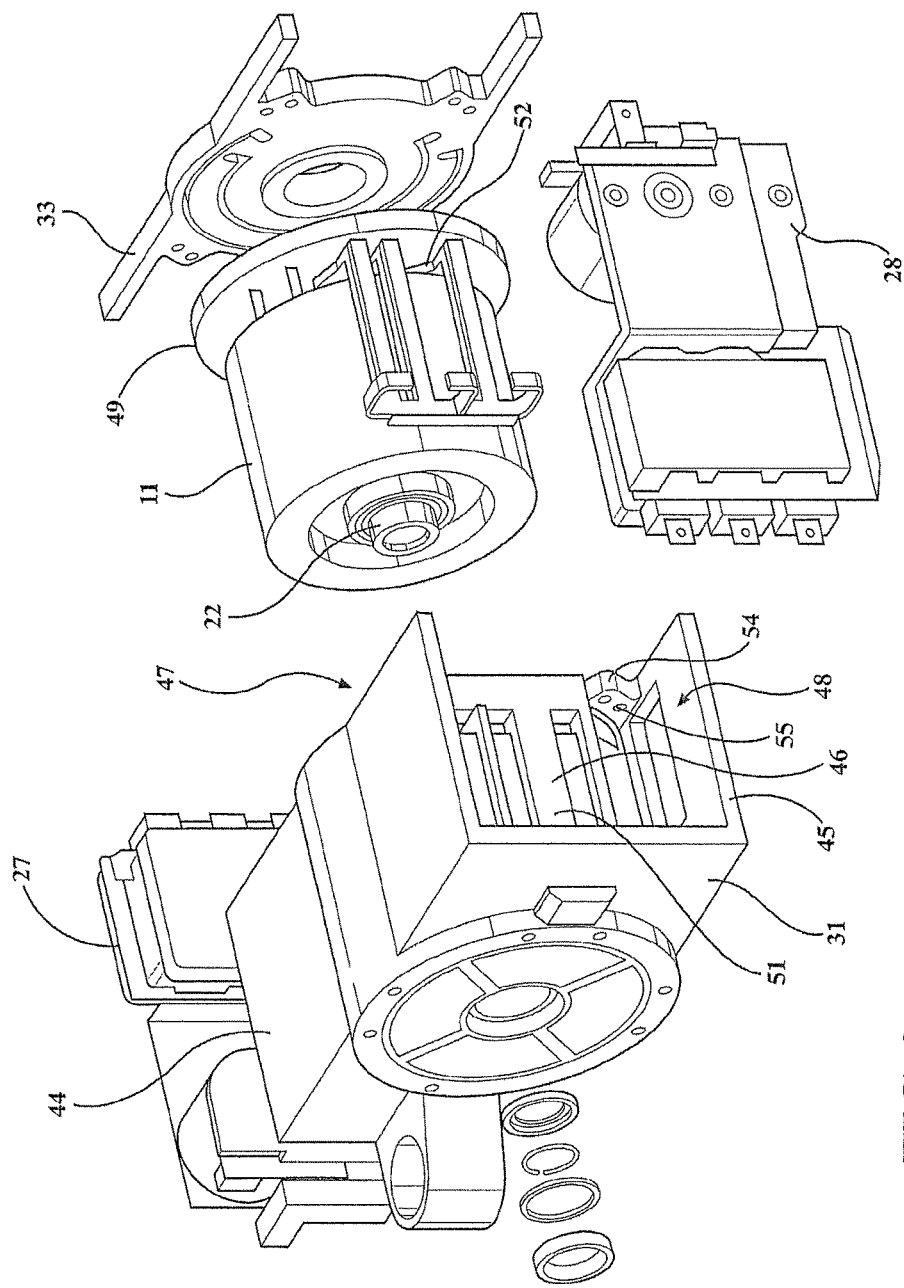
FIG. 9 is another enlarged isometric view thereof.
Figure 13:
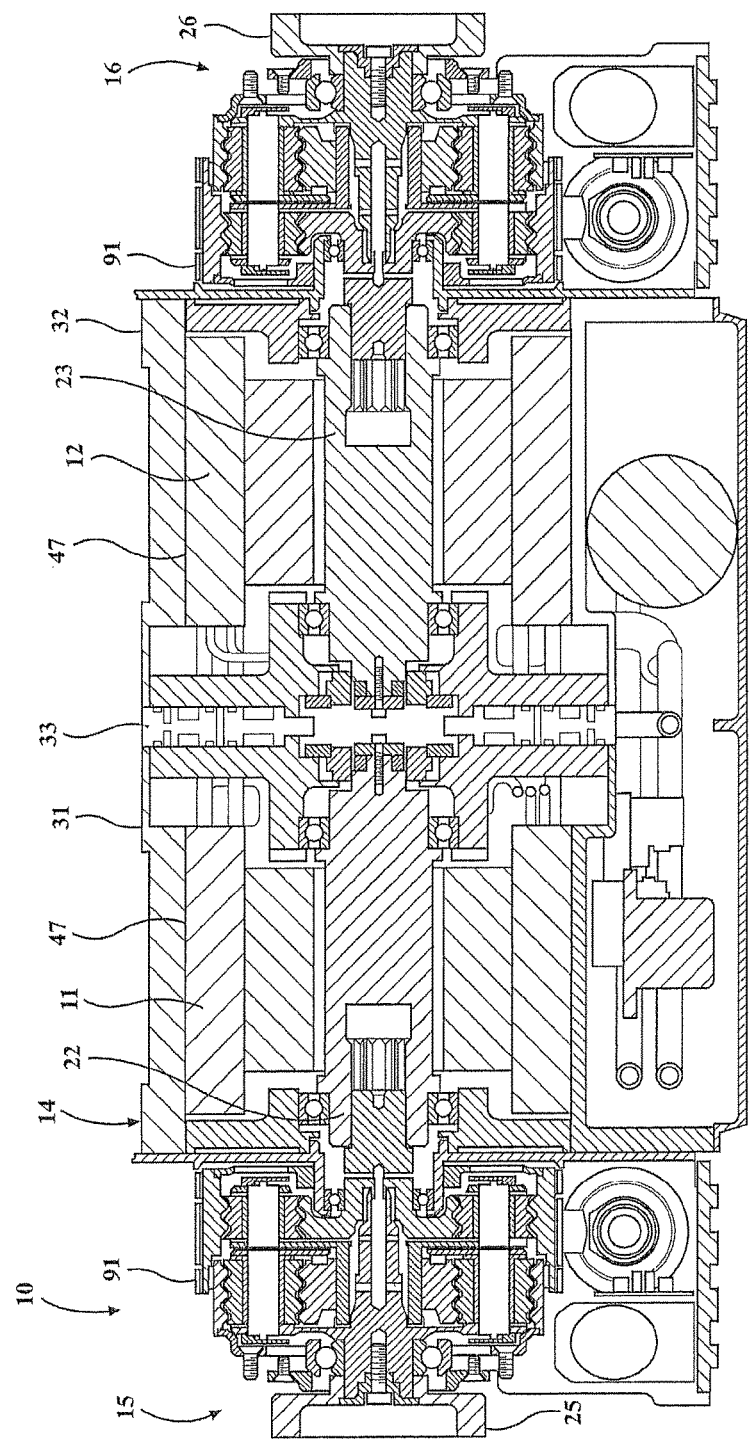
FIG. 13 is a front cross-sectional view of the axle assembly.

During assembly, each of the motors 11 and 12 is slid axially into its respective motor compartment 47 wherein FIGS. 8 and 13 show the motors 11 and 12 fully installed and fastened in place within the compartments 47. Generally, during assembly, the cooling manifold 33 is sandwiched between the motor housings 31 and 32 and between the motor face plates 49 and 50 on the inboard ends of the motors 11 and 12. The motors 11 and 12 are held in position within the motor housings 31 and 32 by complementary slide formations 51 and 52 (FIG. 9). Each motor 11 and 12 has one of the power inverters 27 and 28 electrically connected thereto, wherein the power inverters 27 and 28 are disposed within the opposite forward and rearward side compartments 48 as best seen in FIG. 8. The side compartments 48 are eventually closed off by the front and rear housing panels 33 and 34 as shown in FIGS. 1-3.

To bolt the motor housings 31 and 32 and the cooling manifold 33 together, the motor housings 31 and 32 are each formed with bolt flanges 54 at each top and bottom corner of the side walls 46 as best seen in FIGS. 9 and 10. Each of the bolt flanges 54 has a pair of bores 55, which allows bolts 56 to pass axially therethrough for securing the motor housings 31 and 32 together. The cooling manifold 33 also has four corresponding corner flanges 57 with pairs of bores 58 that allow the bolts 56 to pass therethrough and maintains the housings 31 and 32 and manifold 33 in secure, axial engagement after the bolts are tightened.

Therefore by this assembly, the inventive electric axle assembly 10 provides a modular construction which readily allows for assembly of a dual motor configuration as shown while also allowing for a modified single motor configuration wherein one of the motors 11 and 12 may be omitted from its respective housing 31 or 32 while the housings 31 and 32 and cooling manifold 33 are still assembled in the same manner as described above. In addition, this axle assembly 10 allows for the provision of alternate configurations of a gearbox assembly 15 and 16 since these mechanisms can be interchanged depending upon the vehicle requirements.

During assembly, the first electric motor 11 is installed within the first motor housing 31 and the second electric motor 12 is installed within the second motor housing 32. Each motor 11 and 12 is inserted separately and independently of the other motor and the motor/housing assembly is then positioned for assembly with the manifold 33. Preferably, the cooling manifold 33 is formed as a cooling manifold plate formed in a uniformly thick, plate shape. Once one or more motors 11 and 12 are installed, the cooling manifold plate 33 is positioned between an inboard end of each of the first and second motor housings 31 and 32 and these components are bolted together by fastening bolts 56.

Figure 10A:
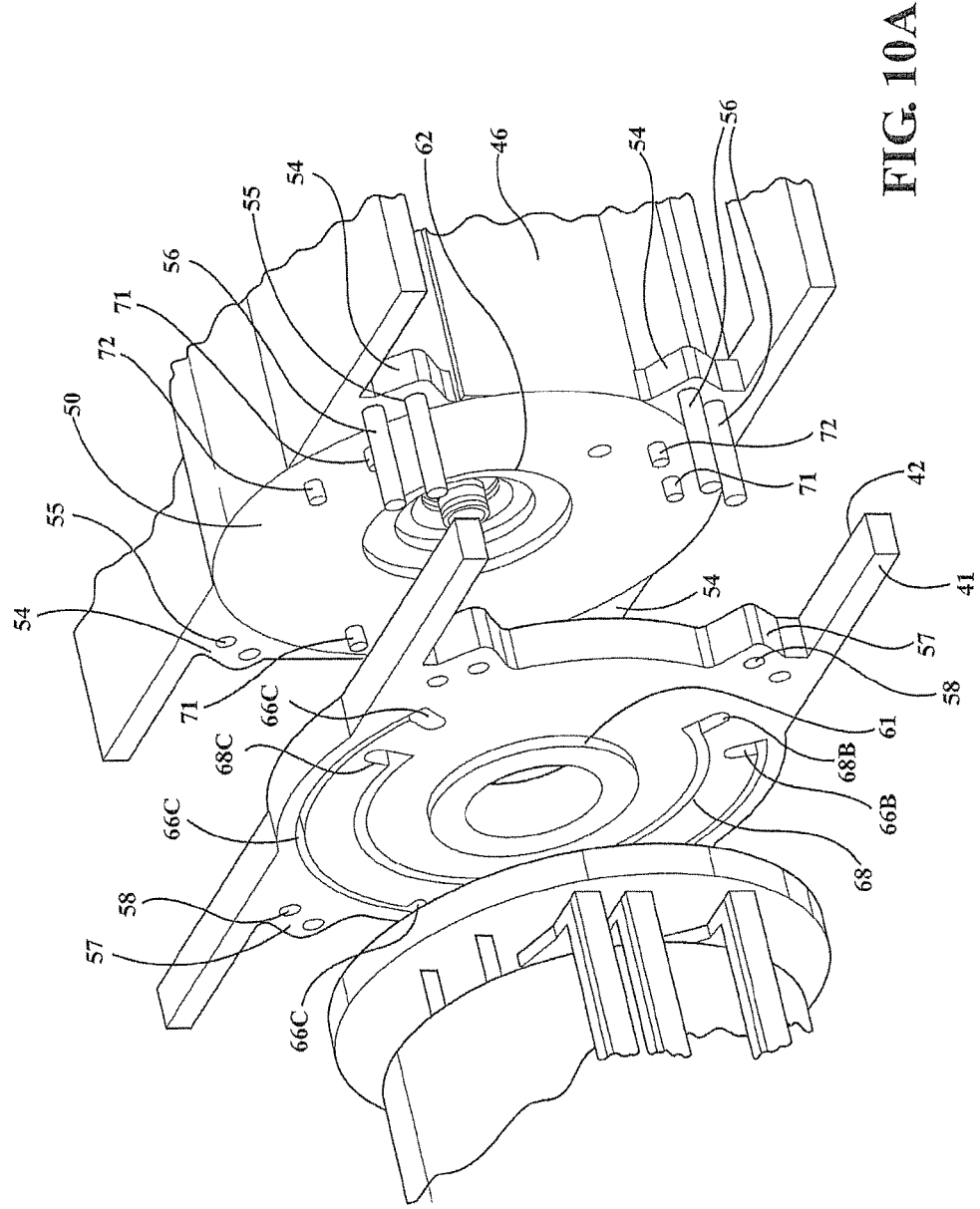
FIG. 10A is an enlarged exploded view showing a cooling manifold in a dual motor configuration.
Figure 10B:
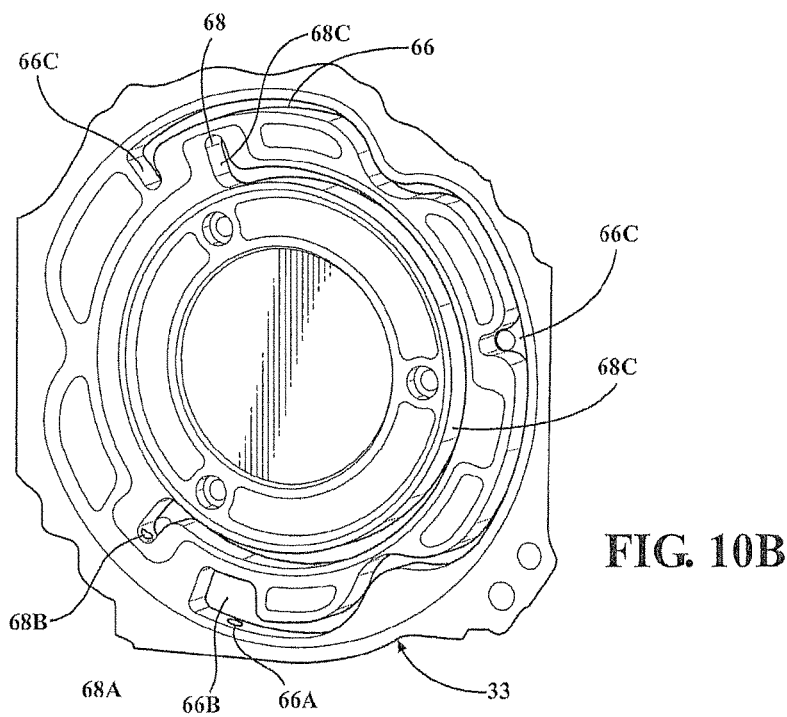
FIG. 10B is an enlarged end view of the cooling manifold.
Figure 10C:
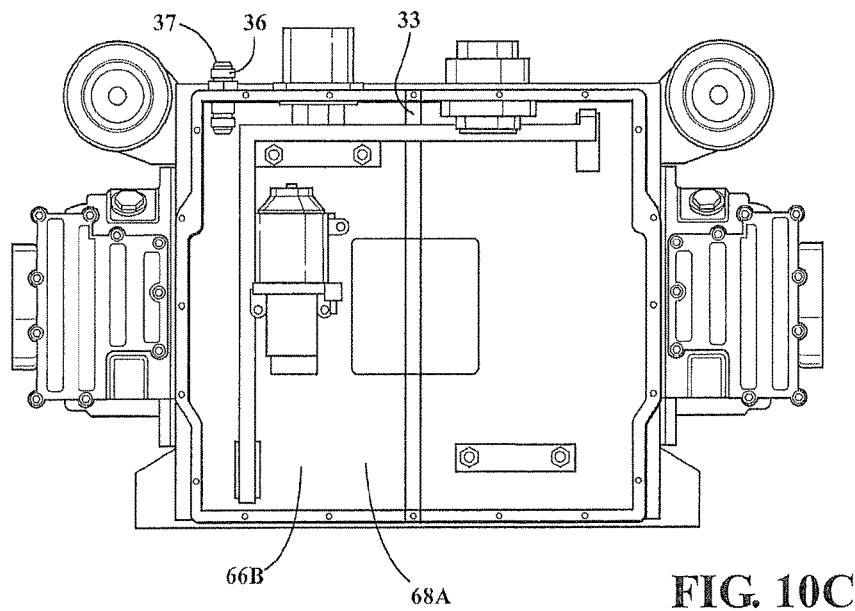
FIG. 10C is a bottom view of the axle assembly.
Figure 14:
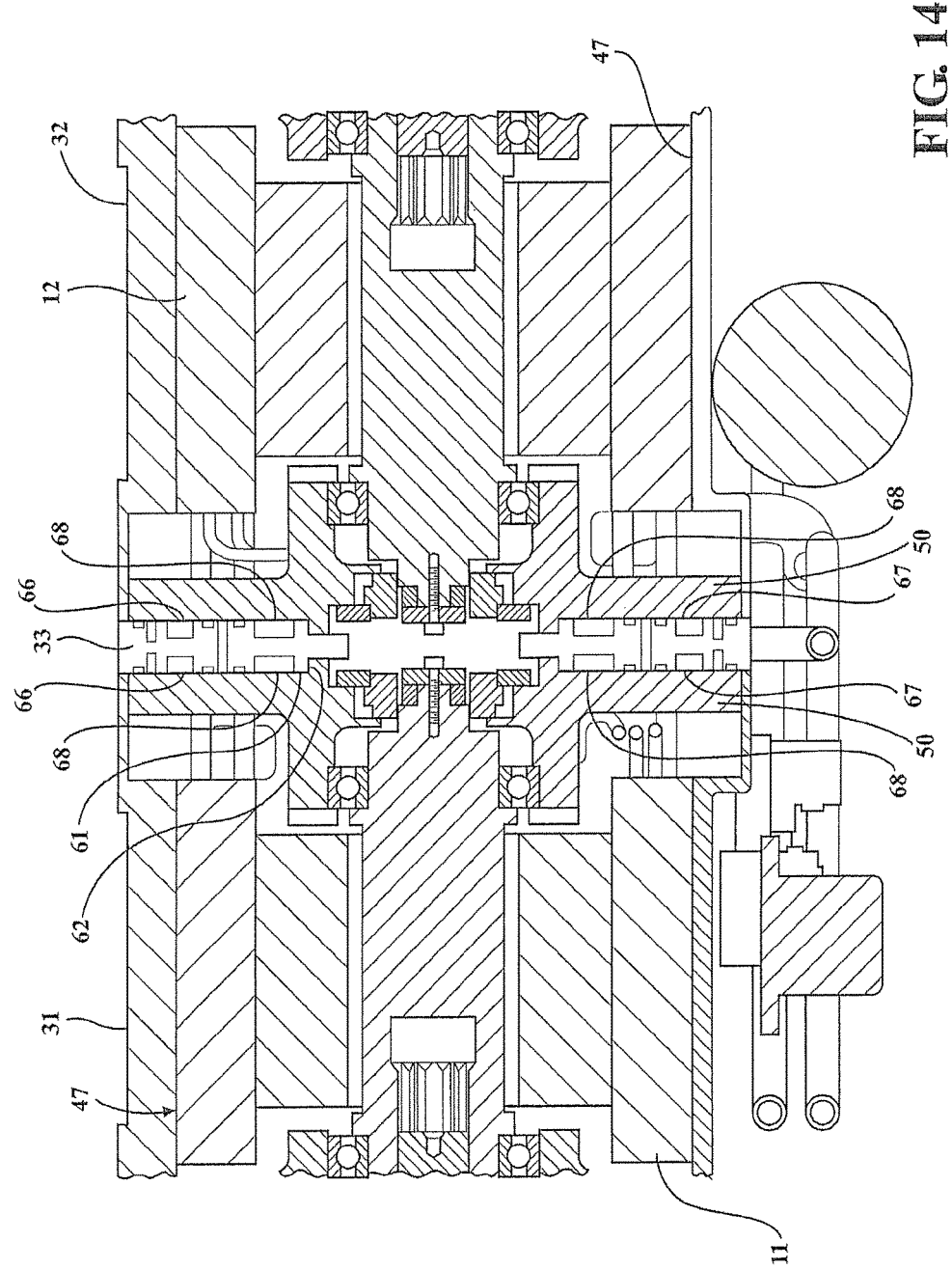
FIG. 14 is an enlarged cross-sectional front view of the center axle region.
Figure 15:
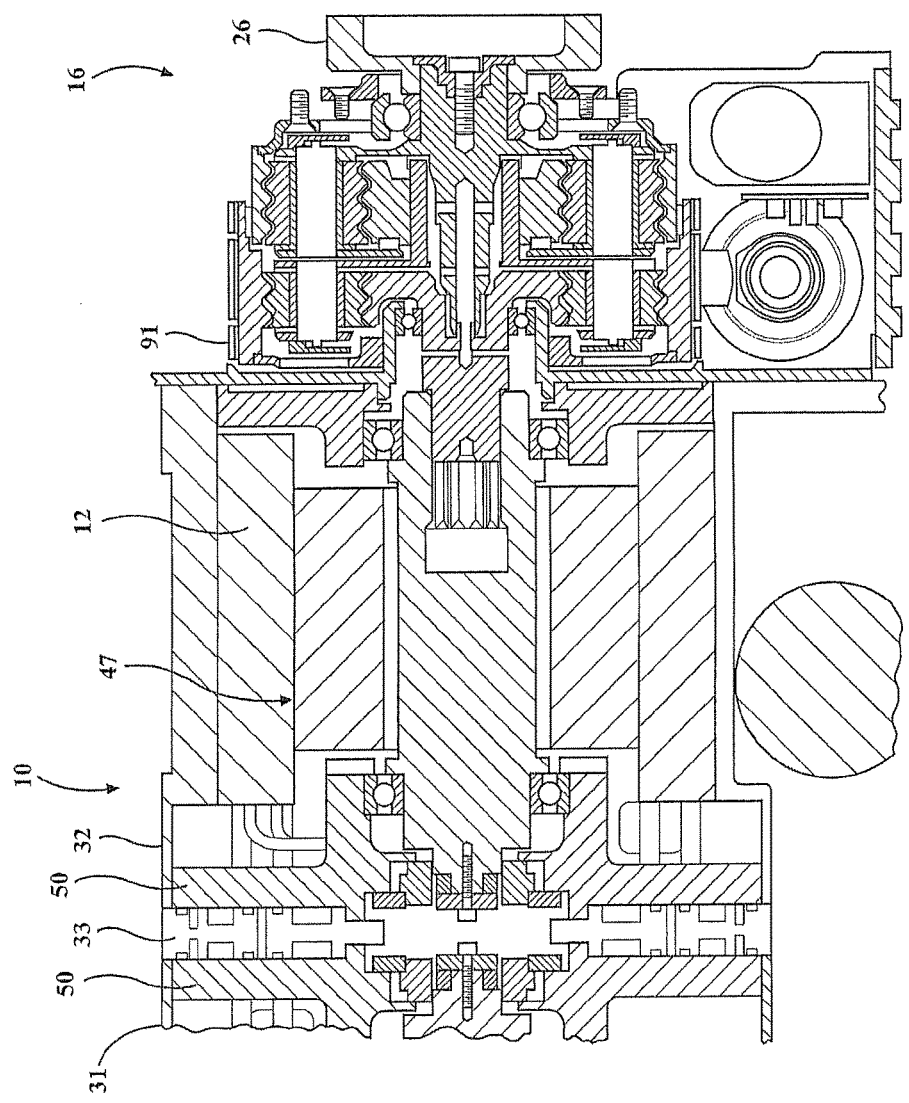
FIG. 15 is an enlarged cross-sectional front view of the gearbox assembly and respective motor.

As referenced above, the cooling manifold plate 33 axially aligns the first and second motors 11 and 12 and covers the first and second motors 11 and 12 in the respective cylindrical chambers 47 of the respective motor housings 31 and 32. The first motor 11 is mounted or fixedly secured to a first side 41 of the cooling manifold plate 33 and the second motor 12 is mounted or fixedly secured to a second side 42 of the cooling manifold plate 33. Preferably, the opposite sides 41 and 42 of the cooling manifold 33 and the motor end plates 50 are provided with complementary alignment formations 61 and 62, which preferably are configured as male and female recesses and projections that maintain radial alignment of the shaft axis 43 of each motor 11 and 12. In FIG. 10A, formation 61 is an axially projecting hub which fits snugly within a complementary socket 62 formed in the motor plate 50. FIG. 14 shows a reversed configuration wherein the formation 61 on the manifold 33 is the socket and the formation 62 on the motor plate 50 is a projecting hub.

Figure 18:
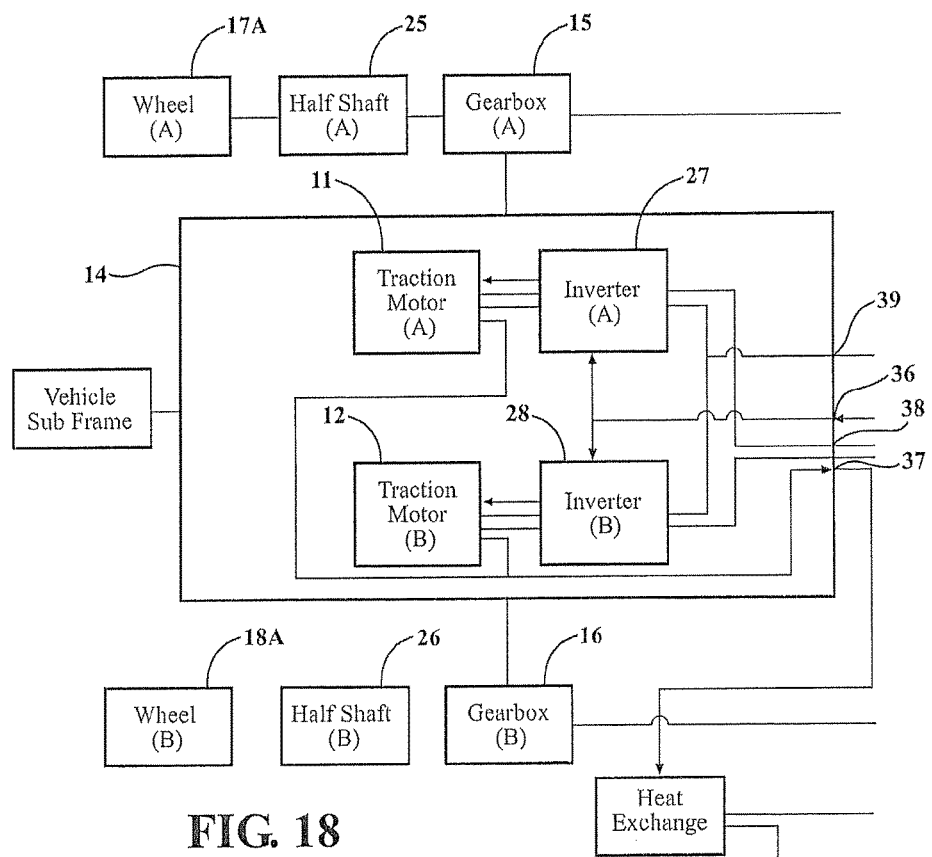
FIG. 18 diagrammatically shows the cooling system for the axle components.

As described above, the cooling manifold plate 33 delivers coolant to various power electronics including the inverters 27 and 28 and also to the motors 11 and 12. More specifically, the coolant flows from the vehicle heat exchanger 64 (FIG. 18) along various flow passageways, which preferably are defined by appropriate tubing, piping or the like. The passageways split a flow of lower temperature or cooled coolant as seen in FIG. 18, which flows separately through each power inverter 27 and 28 in parallel.

Before cooling the power inverters 27 and 28 and any other desirable power electronics, the coolant for each power inverter 27 and 28 enters the cooling manifold 33 (FIG. 10A) which includes arcuate, concentric internal cooling channels 66 and 68 which open through each of the opposite plate faces 41 and 42 for fluid communication with each of the motors 11 and 12. While the power electronics are cooled downstream of the cooling manifold 33, it will be understood that the inverters 27 and 28 and other electronics might be cooled upstream of the cooling manifold 33. The cooling channel 68 serves as an inlet channel, which receives cooled fluid through a single inlet port 68A shown in FIGS. 10B and 10O. The inlet port 68A is formed by a bore extending radially from the manifold edge which opens into a radial leg 68B formed on one end of the channel 68. The cooling channel 68 extends circumferentially and includes additional radial legs 68C, which facilitate coolant flow into the motors 11 and 12.

The cooling channel 66 is formed similarly and serves as the outlet channel for collecting heated coolant from the motors 11 and 12 and discharging same from the cooling manifold 33. The cooling channel 66 has a discharge port 66A which opens out of a radial leg 66B at one end of the cooling channel 66. These ports 66A and 68A are connected to the connectors 37 and 36 by suitable coolant piping or hoses. As such, the cooling manifold 33 has a single point of entry 68A and exit 66A. The cooling channel 66 also extends circumferentially and includes additional radial legs 66C, which facilitate coolant flow out of the motors 11 and 12.

Figure 10D:
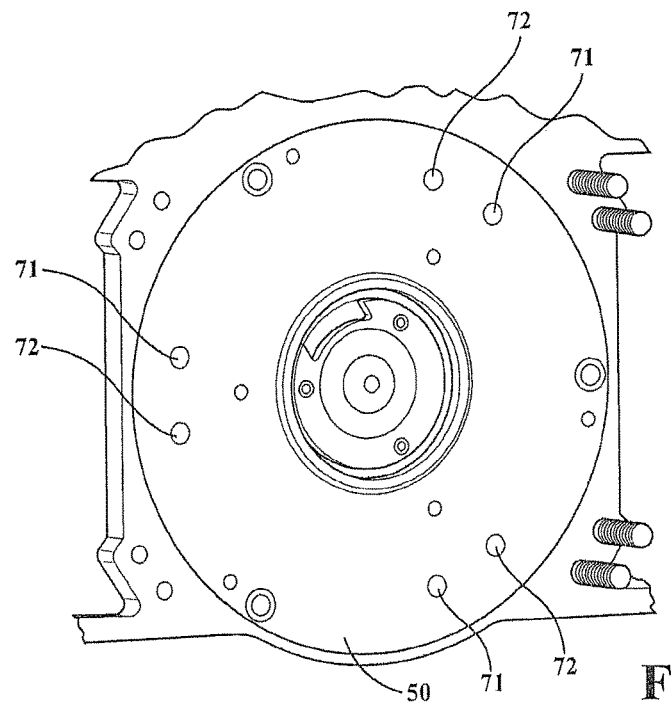
FIG. 10D is an end view of the first motor.
Figure 10E:
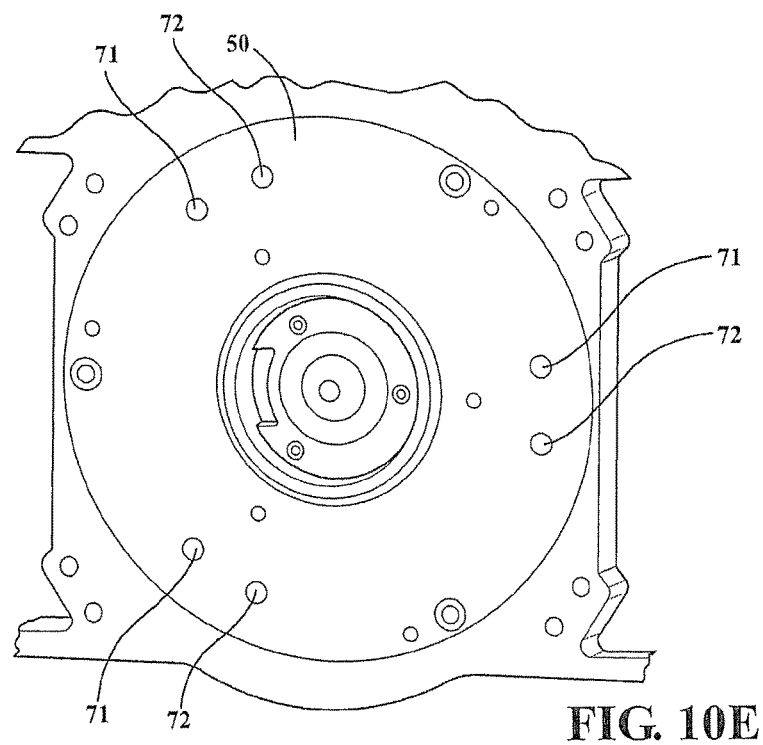
FIG. 10E is an end view of the second motor.

Referring to FIGS. 10A, 10D and 10E, each of the cooling channels 66 and 68 communicates with a respective group of three coolant ports 71 or 72 so that coolant can flow through the channels 66 and 68 and the motors 11 and 12. The inlet channel 68 communicates with coolant ports 72 wherein the ports 72 align with and open into the radial legs 68B and 68C for receiving cooled fluid into the motors 11 and 12. The motors 11 and 12 can include coolant piping or tubing which draws heat away from the motors 11 and 12 as the coolant flows therethrough. The other ports 71 open into the radial legs 66B and 66C of the outlet channel 66, which receives the hotter fluid from the motors 11 and 12. Each of the motor plates 50 for the motors 11 and 12 is provided with the same pattern of ports 71 and 72 wherein one of the motor plates 50 is shown in FIG. 10A. The pattern of cooling channels 66 and 68 opens through each of the opposite manifold sides 41 and 42 to respectively direct flow to the motors 11 and 12. Also, the manifold faces 41 and 42 have shallow gasket grooves disposed radially between the grooves 66 and 68 and radially outside of the outermost groove 66 wherein the gasket grooves include gaskets therein to seal the coolant grooves 66 and 68 radially from each other which prevents coolant from leaking outside of the coolant manifold 33.

In operation, the internal cooling channel 68 is fed with the coolant to port 68A and directs the coolant into the inboard end of each motor 11 and 12 to thereby absorb heat from the motors 11 and 12 and cool same. After cooling the motors, the heated coolant is discharged from the inboard end of each motor 11 and 12 back into the cooling channel 66 where the coolant is merged into a single flow and exits through outlet port 66A. The heated coolant exits the cooling manifold 33 at a single location and then is fed to one of the inverters 27 and 28 and thereafter, to the other of the inverters 27 and 28. After exiting the last inverter, the coolant returns to the heat exchanger 64 for subsequent cooling and refeeding of the cooled coolant back to the motors 11 and 12, cooling manifold 33 and inverters 27 and 28 as diagrammatically shown in FIG. 18. The cooling manifold 33 therefore performs the additional function of defining flow paths or passageways to allow cooling of the motors 11 and 12.

Next, in another aspect of the invention, each motor 11 and 12 drives its respective gearbox assembly 15 and 16. Since each gearbox assembly 15 and 16 is formed substantially the same, common reference numerals are used for common components thereof. In this regard, FIGS. 1-6 generally shows a first gear-set housing 91 fixedly secured to an outboard end of the first motor housing 31. As described further herein, the gear-set housing 91 houses a gear reduction and clutch mechanism that is coupled between the first motor 11 and the output hub 25 that in turn is operatively coupled to a first vehicle wheel. The gear reduction and clutch mechanism reduces a rotational speed output by the first motor 11 and increases an output torque. Generally, the inventive gear reduction and clutch mechanism includes a band brake assembly 94 that is selectively operable to disconnect the first motor 11 from the first vehicle wheel 17A (FIG. 18).

Similarly, in the dual motor configuration, a second gear-set housing 91 is fixedly secured to an outboard end of the second motor housing 32 and houses a respective gear reduction and clutch mechanism that is coupled between the second motor 12 and a second output hub 26 that in turn is operatively coupled to a second vehicle wheel 18A (FIG. 18). Here again, the gear reduction and clutch mechanism reduces a rotational speed output by the second motor 12 and increases an output torque.

Figure 11:
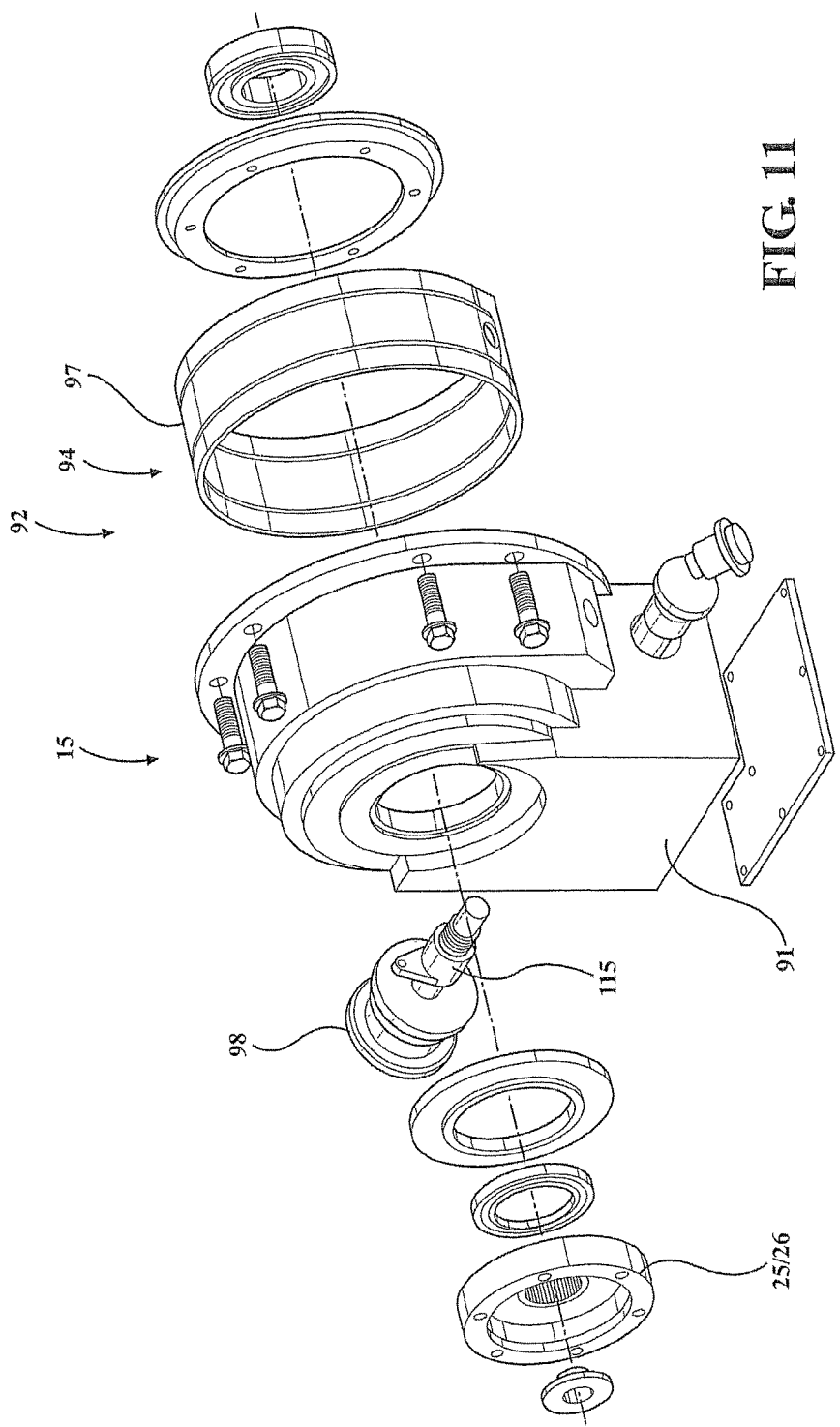
FIG. 11 is an exploded isometric view of a gearbox assembly showing the outboard end components.
Figure 12:
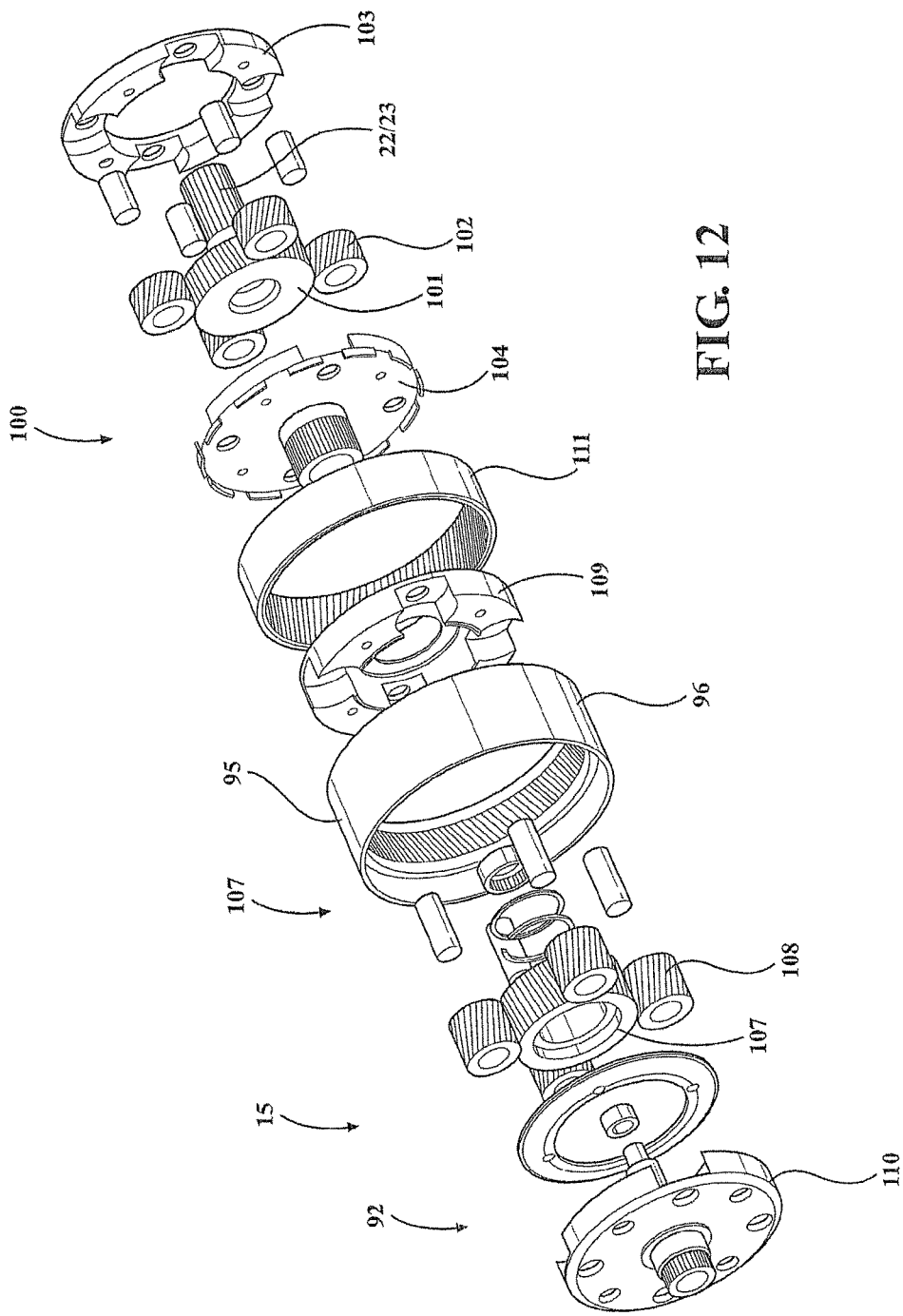
FIG. 12 is an exploded isometric view of a gearbox assembly showing the inboard end components.
Figure 16:
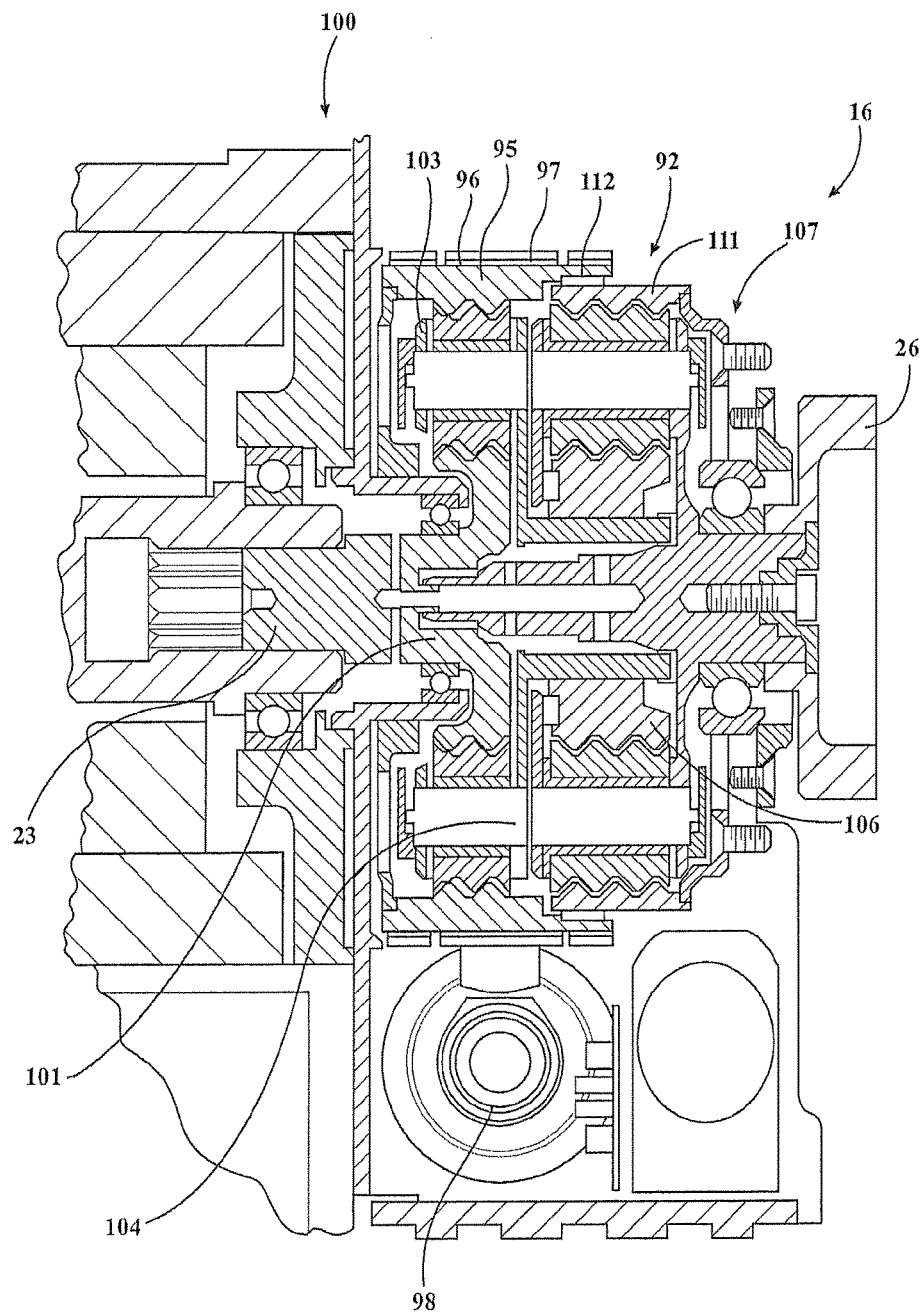
FIG. 16 is an enlarged cross-sectional front view of the gearbox assembly.

More particularly as to FIGS. 11, 12 and 16, the gear reduction and clutch mechanism is identified by numeral 92 and is assembled within the housing 91 and coupled between the outboard end of each electric motor 11/12 and its respective vehicle wheel assembly 17 or 18. The various parts of the mechanism 92 are shown in detail in the exploded view in FIGS. 11 and 12, although the following discussion focuses on the significant parts that are relevant to an understanding of the present invention.

Figure 17:
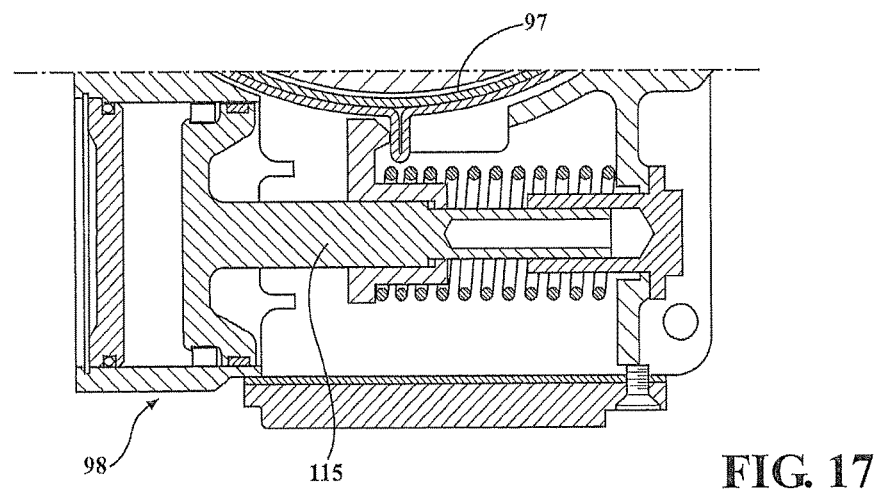
FIG. 17 is an enlarged cross-sectional view of a band brake actuator for a band brake assembly.

The gear reduction mechanism 92 includes a planetary gear system which is preferably formed as a double planetary gear system to provide speed and torque conversion between the electric motors 11/12 and the vehicle wheel assemblies 17/18. Most significantly, each planetary gear system includes a band brake assembly 94 and a primary ring gear 95 having an integrated brake drum or outer surface 96, which is part of the band brake assembly 94. The band brake assembly 94 also includes a band brake 97 and brake actuator 98 (FIGS. 16 and 17), which engages and releases the outer surface 96 of the ring gear 95 for the purpose of connecting and disconnecting the electric motor 11/12 with the respective vehicle wheel 17A/18A. Generally, for example, when the band brake 97 is engaged with the outer surface 96 of the ring gear 95, the output of the electric motor 11/12 is transmitted through the gear reduction mechanism to drive the vehicle wheel assembly 17/18. On the other hand, when the band brake 97 is released from the outer surface 96 of the ring gear 95, the output of the electric motor 11/12 is not transmitted through the gear reduction mechanism.

More particularly, the double planetary gear set includes a first inboard gear set 100 having a sun gear 101 driven by the corresponding motor shaft 22/23, which sun gear 101 in turn drives the planetary pinion gears 102 that drive the planetary carrier 103/104. The pinion gears 102 engage the ring gear 95, which is able to rotate relative to the housing 91 when the band brake 96 is disengaged. The outboard carrier half 104 drives the sun gear 106 of the outboard gear set 107 which in turn drives the planetary pinion gears 108 and planetary carrier 109/110. The pinion gears 108 engage the outer ring gear 111, which is held stationary relative to the housing 91. An annular bearing 112 is provided to allow relative rotation of the ring gear 95 when the ring gear 95 is not engaged by the band brake 97. However, the outboard sun gear 106 drives the output hub 25/26 when the primary ring gear 95 is held via the brake band 97.

The brake actuator 98 uses a hydraulically operated piston 115 (FIG. 17) to actuate the band brake 97 in two states, clamped and unclamped which prevents and permits rotation of the ring gear 95. The effect is to create an on/off function by changing the state of the inboard planetary gear set 100. The hydraulic piston 115 receives pressurized oil from a hydraulic pump integrated into the electrified axle housing 14, which is a low pressure pump having control/monitoring wiring connected to the vehicle control system and piping to and from the brake band piston 115 for selectively operating the piston 115 and engaging and disengaging the brake band 97.

While a double planetary gear system is preferred, the planetary gear system might be formed in a single gear set configuration with only a single gear set engaged by the band brake 97, or a plural gear set configuration having one gear set engaged by the band brake 97 in combination with one or more additional gear sets.

The band brake assembly 94 provides various advantages. There is much less calibration of the controlling computer required to reach satisfactory operation. Other types of disconnecting methods like dog clutches, synchro gears and multi-plate clutches require characterization and development to operate correctly across a broad range of temperatures. Further, the layout of the planetary gear mechanism and the band brake 97 has the ability to be configured in a minimal amount of functional space.

The present invention also provides additional advantages. For example, the modular design provides the advantage wherein the entire unit can be adapted to many vehicles by modifying only the motor housings 31 and 32 to fit the available space. The coolant, electrical and controls can use industry standard interfaces. Further, the configuration of the motor housings 31 and 32 and the intermediate coolant manifold 33 minimizes the overall axial length of the axle assembly 10, which creates an improved ability to fit in the space between the left and right suspension units of the wheel assemblies 17 and 18. Combining ratio reduction and disconnecting functions of the gear reduction and clutch mechanism in one unit frees the space available outside of the opposed motors 11 and 21. In turn, this configuration provides the freedom to change the diameter and length of the opposed electric motors 11 and 12 in larger and smaller combinations to fit a multitude of vehicle sizes and propulsion torque requirements. As such, the electric driving motor length and diameter can be changed without redesign of the band brake assembly 94.

The axle assembly 10 also provides the advantage of using the cooling manifold 33 as a combination manifold and motor mount. This provides axial compactness of the total unit. Further, the power inverters 27 and 28 are contained inside the environmentally sealed motor housing 14. The housing layout separates the two compartments housing the inverters 27 and 28 enabling the easier direct connection to the electric motor and minimization of the overall 'outside diameter' of the motor housings 31 and 32. Still further, modular motor and clutch units can be mixed and matched to meet a wide variety of application situations.

Still further as to the axle assembly 10, the metal manifold plate 33 has multiple internal passages that can channel cooling fluid in and out of the electric motors 11 and 12. The cooling manifold 33 allows a common single location to bring to and return cooling fluids from both motors 11/12 and both inverters 27/28 simultaneously. The manifold plate 33 has been designed in a way that allows the two motors 11/12 to be aligned such that they reside on the same axis 43 and are separated by a minimum possible axial distance so that the total distance between the opposed left-hand and right-hand output hubs 25/26 of the motors 11/12 can be confined to the distance between the corresponding left-hand and right hand suspension apparatus in a motor vehicle. The manifold plate 33 also provides the function of sealing off the inboard ends of the left-hand and right-hand housings 31 and 32 that contain the opposed electric motors 11/12.

Figure 19:
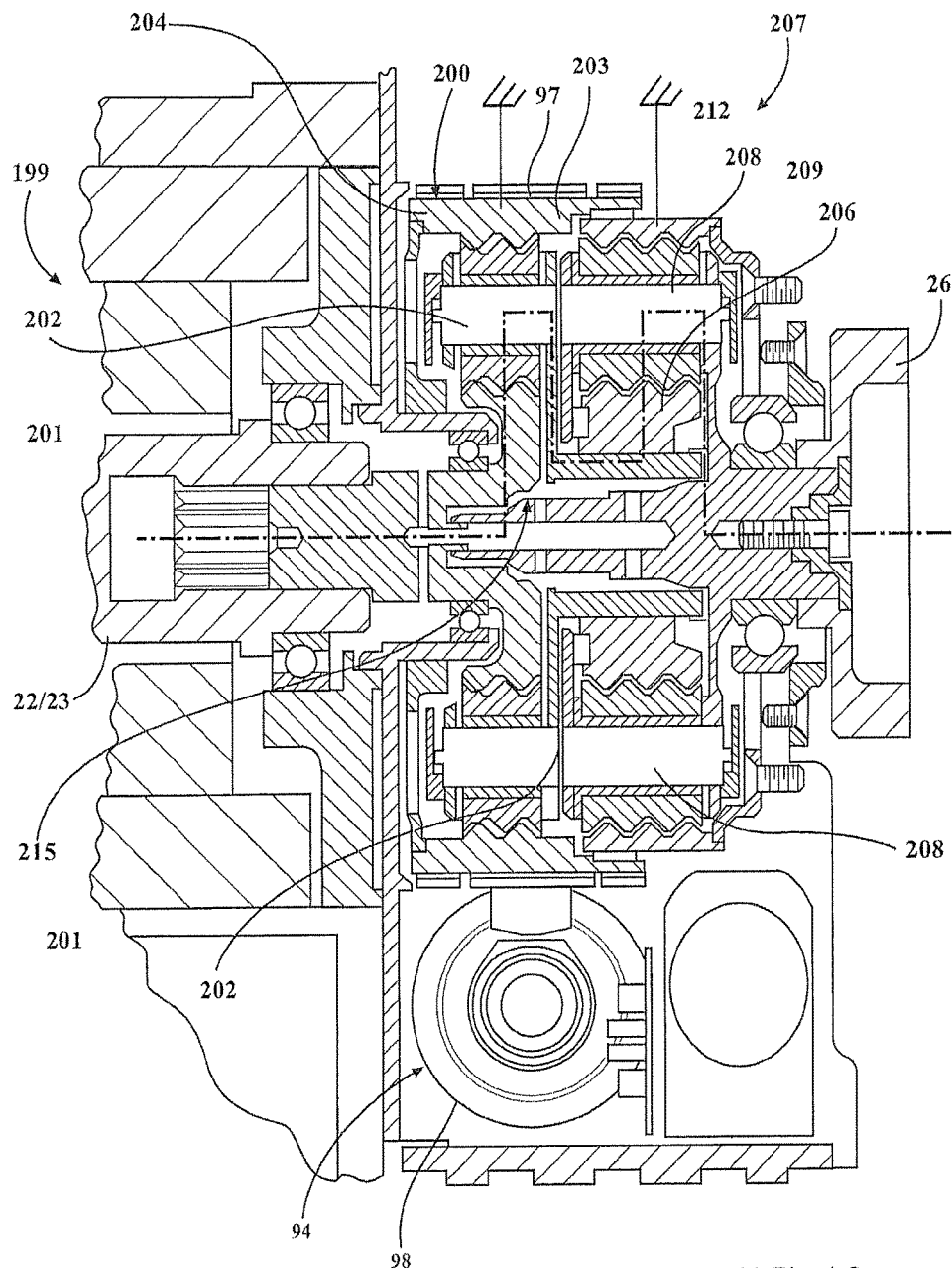
FIG. 19 is a cross-sectional view showing a first embodiment of a two-speed transmission unit for mounting to the motor drive assembly in a first operative condition.
Figure 20:
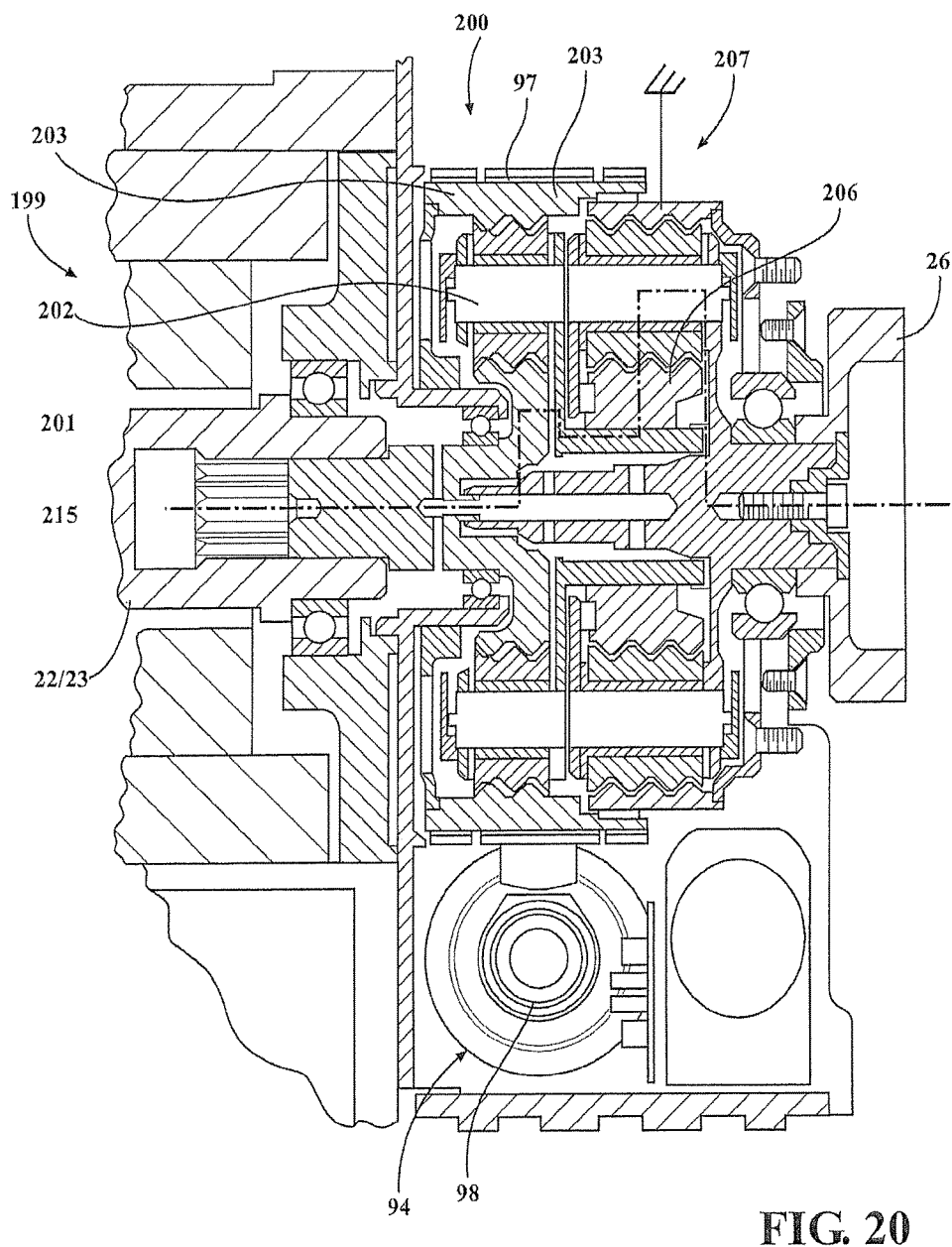
FIG. 20 is a cross-sectional view showing a second operative condition for the transmission unit.

Next, referring to FIGS. 19-20, a gear reduction mechanism can be formed as a multi-speed transmission, which includes a planetary gear system to provide speed and torque conversion between the electric motors 11/12 and the vehicle wheel assemblies 17/18. FIGS. 19-20 illustrate a gear reduction mechanism 199, which can be installed in place of the gear reduction mechanism 92 described above. The gear reduction mechanism 199 is provided as a double planetary gear set having a first inboard gear set 200 having a sun gear 201 driven by the corresponding motor shaft 22/23, which sun gear 201 in turn drives planetary pinion gears 202 that drive a planetary carrier 203. The pinion gears 202 engage a ring gear 204, which is able to rotate relative to the housing 91 when a band brake assembly 94 is disengaged (FIG. 20), or is restrained by the band brake 96 (FIG. 19). The carrier 203 drives a sun gear 206 of an outboard gear set 207 which in turn drives planetary pinion gears 208 and planetary carrier 209 which in turn drive the hub 26. The pinion gears 208 engage a stationary or grounded outer ring gear 211. An annular bearing 212 is provided to allow relative rotation of the ring gear 204 when the ring gear 204 is not engaged by the band brake assembly 94.

Like the gear reduction mechanism 92, the band brake assembly 94 includes a band brake 97 and brake actuator 98 (FIGS. 19 and 20), which engages and releases the first ring gear 204.

Additionally, a clutch 215 is provided such that when the band brake assembly 94 is released, the first sun gear 201 and the first carrier 203 still rotate to drive the second sun gear 201. More particularly, the clutch 215 can be engaged so that the first carrier 203 and sun gear 201 directly drive the second gear set 207, and can be disengaged when the band brake assembly 94 is engaged so that the first gear set 200 then drives the second gear set 207 as a double planetary gear assembly.

More particularly, when the band brake assembly 94 is engaged as seen in FIG. 19, the first outer ring gear 203 is grounded and stationary. The clutch 215 is deactivated. The pinion gears 202 walk around the sun gear 201 to drive the carrier 202 and in turn drive the second sun gear 206. Since ring gear 211 is grounded, the gears 208 walk around sun gear 206 to drive the carrier 209 and the hub 26 connected thereto. This operative condition defines a first speed reduction and output torque.

When the band brake assembly 94 is released as seen in FIG. 20, the first outer ring gear 203 is no longer grounded and instead ring gear 203 spins freely. However, the clutch 215 is then engaged so that the carrier 202 rotates to directly drive the second sun gear 206. This operative condition defines a second speed reduction and output torque, which differs from the first so that a two-speed transmission is formed.

In this manner, the first gear set 207 can be shifted to a direct mode to protect motor over speed concerns. The gear set 207 can be changed to direct by the clutch 215 between the two members of gear set 207. Shifting the gear set 207 to direct reduces the speed at the motor by 50% and creates a second speed. The clutch 215 can either be hydraulic or mechanical. Hydraulic clutches require seals, pistons, and seal rings etc. These components all need axial space to be functional. Mechanical clutches are generally direction sensitive but require less axial space than seal rings and clutch plates and pistons. By using a selectable mechanical clutch 215, the transmission can dictate when the clutch 215 will be active. The selectable clutch 215 has a device to activate or deactivate the clutch. Generally, a ball ramp can be used to deactivate the free wheeler in the clutch 215.

Figures 21, 22:
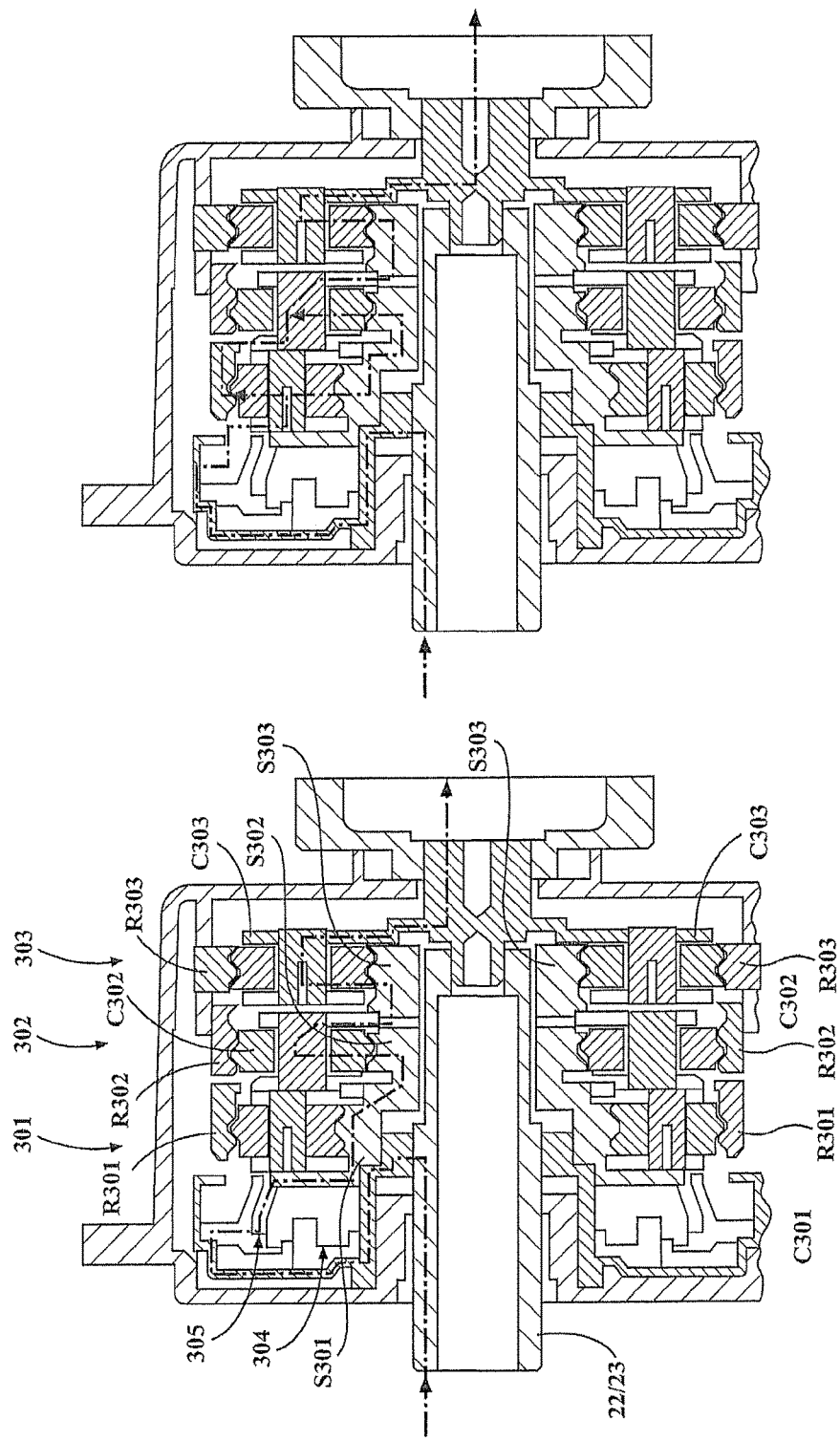
FIG. 21 is a cross-sectional view showing a second embodiment of a two-speed transmission unit for mounting to the motor drive assembly in a first operative condition.
FIG. 22 is a cross-sectional view showing a second operative condition for the transmission unit.
Figure 23:
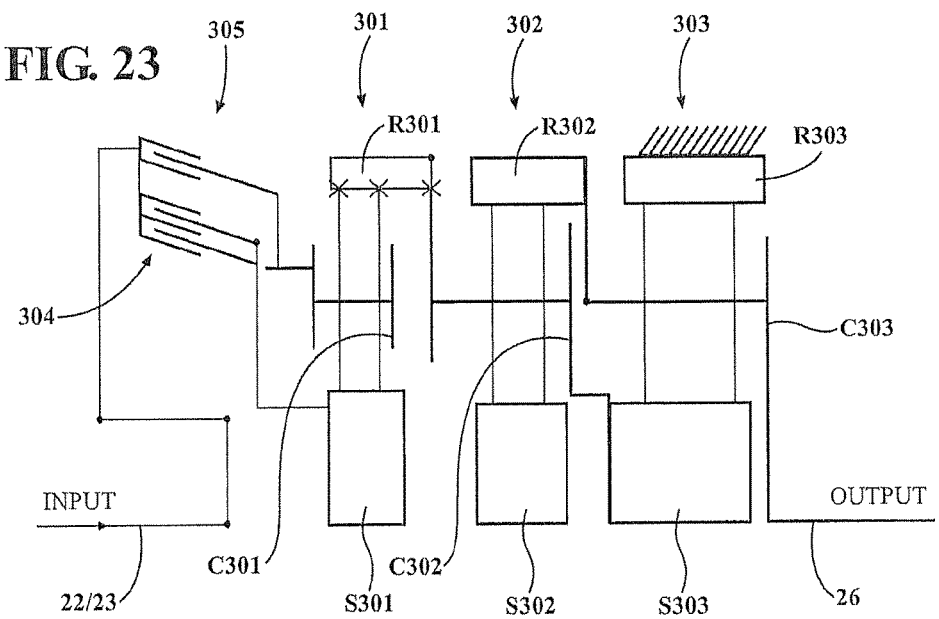
FIG. 23 diagrammatically illustrates component connections within the second transmission unit.

Referring to FIGS. 21-23, a further arrangement is shown. This second configuration 300 uses three plans of gears or gear sets 301, 302 and 303, and two input clutches 304 and 305 located before the first gear set 301. The power from the motor is directed through the input shaft 22/23 to either of the clutches 304 and 305 depending on the speed and torque requested by a power train control unit. The gear sets 301-303 include respective sun gears S301, S302, S303, pinion gear driven carriers C301, C302, C303, and ring gears R301, R302, R303. The first and second sun gears S301 and S302 are driven together by shaft 22/23.

If lower speed and more torque are requested then the first clutch 304 would be activated as seen in FIG. 21. The torque from the clutch 304 is delivered to sun S3011 and sun S302 since both are directly connected to each other. The torque from sun S302 is transmitted to the gear train plane and carrier C302. The torque from rotation of the planetary gears about sun S302 is split between ring R302 and the carrier C302. Ring R302 is connected to carrier C303 which is in turn the output of the transmission that drives the hub 26. Second carrier C302 is directly connected to third sun S303. At this stage in this transmission there is an input and an output and then there is a reaction to ground by ring R303 which is directly connected to ground at the enclosure or case 307 of the transmission.

If a higher speed and lower torque are requested, the second clutch 305 is activated while first clutch 304 is deactivated. With clutch 305 activated, torque is delivered to the first carrier C301. The torque is now split between the first sun S301 and first ring R301 in relation to the ring to sun ratio. As described previously first sun S301 and second sun S302 are connected. Ring S301 is directly connected to second carrier C302. The torque flow is the same as previously described except for the lower torque as seen by the bolded torque transmission lines in FIG. 22.

The design of the two clutches 304 and 305 can be hydraulic, mechanical with hydraulic release/activating or mechanical with electric release. The second arrangement is shown with hydraulic activated clutches. This arrangement thereby provides a two-speed transmission.

Figure 24:
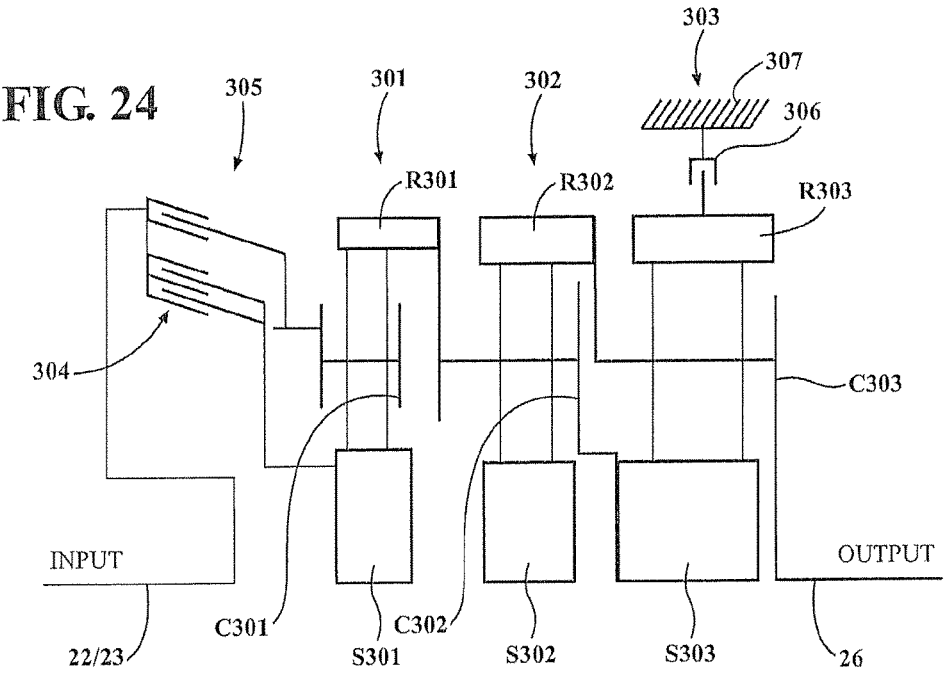
FIG. 24 diagrammatically illustrates component connections within a third transmission unit.

There is a third three speed configuration that is shown in FIG. 24 and represents a modification of the configuration and components of FIGS. 21-23 above. This third arrangement works the same as the second arrangement through low range and high range which are operated by the clutches 304 and 305 with the third ring R303 being grounded. However, a clutch 306 such as a free wheeler clutch or a plate clutch is added to replace the permanent attachment of ring R303 to the transmission case 307 (ground). As such, it is possible to create a direct mode meaning the transmission ratio will become 1:1 or equal to motor RPM. To achieve this state both input clutches 304 and 305 would be activated. The application of both clutches will cause all of the elements in the first gear set 301 to rotate at unity and since gear set 301 is rotating 1:1 then because ring R301 is connected to carrier C302 and sun S301 is connected to sun S302, then carrier C302 is also rotating at 1:1. Carrier C303 will also rotate at 1:1 because ring R302 is connected to carrier C303 and carrier C302 is connected to sun S303. This condition generates a third condition of speed and torque.

Although particular preferred embodiments of the invention have been disclosed in detail for illustrative purposes, it will be recognized that variations or modifications of the disclosed apparatus, including the rearrangement of parts, lie within the scope of the present invention.

What is claimed:

1. An electric axle assembly comprising:
a motor housing unit having a pair of electric motors arranged within said motor housing unit, each of said motors having a rotatable motor shaft for driving a vehicle wheel during shaft rotation;
a double planetary gear set which is drivingly connected to said output shaft of a respective one of said motors and includes an output hub engagable with a respective vehicle wheel wherein rotation of said output shaft of said respective motor effects rotation of said output hub through said double planetary gear set connected therebetween, said double planetary gear set comprising a housing, and a plurality of gear sets supported in said housing and rotatably connected together, an inboard one of said gear sets being rotatably connected to said respective output shaft and an outboard one of said gear sets being connected to said drive hub, each of said gear sets including an internal sun gear, a plurality of planetary pinion gears which are supported on a carrier and are rotatably drivable by said sun gear, and an outer ring gear engaged with said planetary pinion gears so that rotation of said sun gear effects rotation of said pinion gears and said carrier when said outer ring gear is non-rotatably fixed relative to said housing, said outer ring gear of a first one of said gear sets being a fixed ring gear which is non-rotatably fixed in position within said housing such that rotation of said sun gear continuously effects rotation of said pinion gears and said respective carrier, and said outer ring gear of a second one of said gear sets being a releasable ring gear which is selectively fixable within said housing so as to be intermittently rotatable in response to rotation of said sun gear and said pinion gears associated therewith; and
a band brake assembly selectively engagable with said releasable ring gear wherein said band brake assembly is intermittently operative between a braked condition which clamps and prevents rotation of said releasable ring gear to rotatably couple said output shaft and said drive hub, and an unbraked condition which unclamps and permits rotation of said releasable ring gear to rotatably decouple said drive hub from said output shaft.

2. The electric axle assembly according to claim 1, wherein said double planetary gear set is connected to each of said motors wherein said output shafts of said motors can be simultaneously coupled or decoupled to said respective output shafts while said output shafts rotate.

3. The electric axle assembly according to claim 2, wherein each said band brake assembly includes an actuator to selectively brake and release said releasable ring gear.

4. The electric axle assembly according to claim 1, wherein said releasable ring gear includes an annular outer brake surface, and said band brake assembly includes a band brake which surrounds said outer brake surface and selectively clamps and unclamps said outer brake surface to selectively prevent or permit rotation of said releasable ring gear relative to said housing.

5. The electric axle assembly according to claim 3, wherein each said band brake assembly includes an actuator connected to said band brake to selectively clamp and unclamp said releasable ring gear.

6. The electric axle assembly according to claim 5, wherein said actuator is a hydraulic cylinder which is operable to effect said clamping and unclamping of said releasable ring gear by said band brake.

7. The electric axle assembly according to claim 1, wherein said first one of said gear sets is said outboard gear seat and said second one of said gear sets is said inboard gear set.

8. An electric axle assembly comprising:
a motor housing unit having a pair of electric motors arranged within said motor housing unit, each of said motors having a rotatable motor shaft for driving a vehicle wheel during shaft rotation;
a planetary gear set which is drivingly connected to said output shaft of a respective one of said motors and includes an output hub engagable with a respective vehicle wheel wherein rotation of said output shaft of said respective motor effects rotation of said output hub through said planetary gear set connected therebetween, said planetary gear set comprising a housing, and one or more gear sets supported in said housing and rotatably connected together, each said gear set including an internal sun gear, a plurality of planetary pinion gears which are supported on a carrier and are rotatably drivable by said sun gear, and an outer ring gear engaged with said planetary pinion gears so that rotation of said sun gear effects rotation of said pinion gears and said carrier when said outer ring gear is non-rotatably fixed relative to said housing, said outer ring gear of a first said gear set being a releasable ring gear which is selectively fixable within said housing so as to be intermittently rotatable in response to rotation of said sun gear and said pinion gears associated therewith; and
a band brake assembly selectively engagable with said releasable ring gear wherein said band brake assembly is intermittently operative between a braked condition which clamps and prevents rotation of said releasable ring gear to rotatably couple said output shaft and said drive hub, and an unbraked condition which unclamps and permits rotation of said releasable ring gear to rotatably decouple said drive hub from said output shaft.

9. The electric axle assembly according to claim 8, wherein an inboard end of said planetary gear set being rotatably connected to said respective output shaft and an outboard end of said planetary gear set being connected to said drive hub.

10. The electric axle assembly according to claim 8, wherein said outer ring gear of a second one of said gear sets is a fixed ring gear which is non-rotatably fixed in position within said housing such that rotation of said sun gear continuously effects rotation of said pinion gears and said respective carrier.

11. The electric axle assembly according to claim 10, wherein said first and second gear sets are operatively connected together.

* * * * *